(12) United States Patent
Guede et al.

(10) Patent No.: US 12,541,883 B2
(45) Date of Patent: Feb. 3, 2026

(54) METHOD AND AN APPARATUS FOR RECONSTRUCTING AN OCCUPANCY MAP OF A POINT CLOUD FRAME

(71) Applicant: InterDigital CE Patent Holdings, SAS, Paris (FR)

(72) Inventors: Celine Guede, Cesson Sevigne (FR); Julien Ricard, Plouër-sur-Rance (FR); Pierre Andrivon, Liffre (FR); Jean-Eudes Marvie, Betton (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 390 days.

(21) Appl. No.: 18/031,037

(22) PCT Filed: Sep. 29, 2021

(86) PCT No.: PCT/EP2021/076744
§ 371 (c)(1),
(2) Date: Apr. 10, 2023

(87) PCT Pub. No.: WO2022/073816
PCT Pub. Date: Apr. 14, 2022

(65) Prior Publication Data
US 2023/0377204 A1    Nov. 23, 2023

(30) Foreign Application Priority Data
Oct. 9, 2020    (EP) .................... 20306184

(51) Int. Cl.
*G06T 9/00*    (2006.01)
*G06T 3/4046*    (2024.01)

(52) U.S. Cl.
CPC ........... *G06T 9/001* (2013.01); *G06T 3/4046* (2013.01); *G06T 9/002* (2013.01)

(58) Field of Classification Search
None
See application file for complete search history.

(56) References Cited

U.S. PATENT DOCUMENTS

| | | | |
|---|---|---|---|
| 10,242,484 B1 * | 3/2019 | Cernigliaro | ............. G06T 9/008 |
| 10,818,069 B2 * | 10/2020 | Cernigliaro | ............ H04N 19/94 |
| 11,158,109 B2 * | 10/2021 | Cernigliaro | .......... H04N 19/186 |
| 11,170,556 B2 * | 11/2021 | Oh | .......................... G06T 15/04 |
| 11,341,687 B2 * | 5/2022 | Oh | .......................... G06T 9/001 |

(Continued)

OTHER PUBLICATIONS

Anonymous, "Common Test Conditions for Point Cloud Compression", International Organization for Standardization (ISO), Coding of Moving Pictures and Audio, ISO/IEC JTC 1/SC 29/WG 11, Document: N19324, Alpbach, Austria, online Apr. 2020, 16 pages.

(Continued)

*Primary Examiner* — Anand P Bhatnagar
(74) *Attorney, Agent, or Firm* — Condo Roccia Koptiw LLP

(57) ABSTRACT

At least one embodiment relates to a method and an apparatus for reconstructing an occupancy map comprising occupancy data of a volumetric content, wherein reconstructing the occupancy map comprises: —decoding the occupancy map at a first resolution, —determining a scale factor as a function of the first resolution, —upscaling the occupancy map by the scale factor, using a neural network.

20 Claims, 17 Drawing Sheets

(56) References Cited

U.S. PATENT DOCUMENTS

| | | | |
|---|---|---|---|
| 11,380,019 B2* | 7/2022 | Oh | G06T 19/00 |
| 11,394,979 B2* | 7/2022 | Oh | H04N 19/70 |
| 11,418,564 B2* | 8/2022 | Oh | H04N 13/172 |
| 11,601,634 B2* | 3/2023 | Oh | H04N 13/161 |
| 11,818,190 B2* | 11/2023 | Oh | H04N 19/597 |
| 12,021,910 B2* | 6/2024 | Lee | H04L 65/762 |
| 12,273,405 B2* | 4/2025 | Oh | H04L 65/762 |
| 2019/0114821 A1* | 4/2019 | Cernigliaro | H04N 19/94 |
| 2019/0114822 A1* | 4/2019 | Cernigliaro | G06T 9/008 |
| 2021/0005016 A1* | 1/2021 | Oh | G06T 9/001 |
| 2021/0209806 A1* | 7/2021 | Oh | G06T 19/00 |
| 2021/0227232 A1* | 7/2021 | Oh | H04N 21/4728 |
| 2021/0320962 A1* | 10/2021 | Oh | G06T 9/001 |
| 2022/0060529 A1* | 2/2022 | Oh | H04N 13/194 |
| 2024/0048604 A1* | 2/2024 | Oh | H04L 65/70 |

OTHER PUBLICATIONS

Anonymous, "V-PCC Codec Description", International Organization for Standardization (ISO), Coding of moving pictures and audio, ISO/IEC JTC 1/SC 29WG 11, Document: N19332, Jun. 17, 2020, 73 pages.

Zhou et al., "A Review of Deep Learning for Single Image Super-Resolution", Institute of Electronics and Electrical Engineers (IEEE), 2019 International Conference on Intelligent Informatics and Biomedical Sciences (ICIIBMS), Shanghai, China, Nov. 21, 2019, 4 pages.

Yang et al., "Deep learning for Single Image Super-Resolution: A Brief Review", Institute of Electronics and Electrical Engineers (IEEE), IEEE Transactions on Multimedia, vol. 21, Issue No. 12, Dec. 2019, 15 pages.

Anonymous, "High Efficiency Video Coding", ITU-T Telecommunication Standardization Sector of ITU, Series H: Audiovisual and Multimedia Systems, Infrastructure of audiovisual services—Coding of moving video, Recommendation ITU-T H.265, Feb. 2018, 692 pages.

Quach et al., "Learning Convolutional Transforms for Lossy Point Cloud Geometry Compression", Institute of Electrical and Electronics Engineers (IEEE), 2019 IEEE International Conference on Image Processing (ICIP), Taipei, Taiwan, Sep. 22, 2019, 5 pages.

Smith et al., "3D Object Super-Resolution", ARXIV Library, Cornell University, Feb. 27, 2018, 9 pages.

Anonymous, "V-PCC performance evaluation and anchor results", International Organization for Standardization (ISO), Coding of Moving Pictures and Audio, ISO/IEC JTC 1/SC29 WG11, Document: w19087, Brussels, Belgium, Jan. 2020, 2 pages.

Qian et al., "PU-GCN: Point Cloud Upsampling using Graph Convolutional Networks", ARXIV Library, Cornell University, Mar. 28, 2020, 27 pages.

Jia et al., "Convolutional Neural Network-based Occupancy Map Accuracy Improvement for Video-based Point Cloud Compression", Institute of Electronics and Electrical Engineers (IEEE), IEEE Transactions on Multimedia, vol. 24, May 12, 2021, 14 pages.

Anonymous, "svn_HEVC Software Revision 4998: /tags/HM-16.18+SCM-8.7", URL: https://hevc.hhi.fraunhofer.de/svn/svn_HEVCSoftware/tags/HM-16.18+SCM-8.7/, Jan. 2018, 1 page.

Ha et al., "Deep Learning Based Single Image Super-resolution: A Survey", International Journal of Automation and Computing, vol. 16, Issue No. 4, Jul. 19, 2019, 14 pages.

Wu et al., "Point Cloud Super Resolution with Adversarial Residual Graph Networks", ARXIV Library, Cornell University, Aug. 6, 2019, 10 pages.

Cai et al., "[VPCC][New proposal] Adaptive occupancy map up-sampling", International Organization for Standardization (ISO), Coding of Moving Pictures and Audio, ISO/IEC JTC1/SC29/WG11 MPEG2019/, Document: m46455, Marrakesh, Morocco, Jan. 2019, 3 pages.

Anonymous, Information Technology—Coded Representation of Immersive Media—Part 5: Visual Volumetric Video-based Coding (V3C) and Video-based Point Cloud Compression (V-PCC), International Organization for Standardization, ISO/IEC JTC1/SC29 WG11, ISO/IEC 23090-5:2019(E), 2019, 307 pages.

Anonymous, "Information technology—Coded Representation of Immersive Media—Part 5: Visual Volumetric Video-based Coding (V3C) and Video-based Point Cloud Compression (V-PCC)", International Organization for Standardization, ISO/IEC FDIS 23090-5, Document: N19579, Sep. 21, 2020, 353 pages.

Anonymous, "Information Technology—Coded Representation of Immersive Media—Part 5: Video-based Point Cloud Compression", International Organization for Standardization, MPEG Document N18030, ISO/IEC 23090-5:2018(E), Oct. 8, 2018, 72 pages.

Hoppe et al., "Surface Reconstruction from Unorganized Points", SIGGRAPH '92: Proceedings of the 19th Annual Conference on Computer Graphics and Interactive Techniques, Jul. 1992, 8 pages.

* cited by examiner (a)

(b)

|   |   |   |   |   |   |   |   |
|---|---|---|---|---|---|---|---|
| 0 | 0 | 0 | 1 | 1 | 1 | 0 | 1 |
| 0 | 0 | 0 | 0 | 1 | 1 | 1 | 1 |
| 0 | 0 | 0 | 0 | 1 | 1 | 1 | 1 |
| 0 | 0 | 0 | 0 | 1 | 1 | 1 | 1 |
| 0 | 0 | 0 | 0 | 0 | 1 | 1 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(c)

METHOD AND AN APPARATUS FOR RECONSTRUCTING AN OCCUPANCY MAP OF A POINT CLOUD FRAME

CROSS REFERENCE TO RELATED APPLICATIONS

This application is a U.S. National Stage Application under 35 U.S.C. § 371 of International Patent Application No. PCT/EP2021/076744, filed Sep. 29, 2021, which is incorporated herein by reference in its entirety.

This application claims priority to European Application No. 20306184.1, filed Oct. 9, 2020, which is incorporated herein by reference in its entirety.

TECHNICAL FIELD

At least one of the present embodiments relates generally to a processing of a point cloud. In particular, a neural network upscaling of an occupancy map is presented.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment.

Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

The automotive industry and the autonomous car are also domains in which point clouds may be used. Autonomous cars should be able to "probe" their environment to make good driving decisions based on the reality of their immediate neighbors. Typical sensors like LIDARs (LIght Detection And Ranging) produce dynamic point clouds that are used by a decision engine. These point clouds are not intended to be viewed by a human being and they are typically small, not necessarily colored, and dynamic with a high frequency of capture. These point clouds may have other attributes like the reflectance provided by the LIDAR as this attribute provides good information on the material of the sensed object and may help in making decisions.

Virtual Reality and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing Virtual Reality (VR) worlds.

It is important in many applications to be able to distribute dynamic point clouds to an end-user (or store them in a server) by consuming only a reasonable amount of bit-rate (or storage space for storage applications) while maintaining an acceptable (or preferably very good) quality of experience. Efficient compression of these dynamic point clouds is a key point in order to make the distribution chain of many immersive worlds practical.

At least one embodiment has been devised with the foregoing in mind.

SUMMARY

The following presents a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one embodiment, there is provided a method, comprising reconstructing an occupancy map comprising occupancy data of a volumetric content, wherein reconstructing the occupancy map comprises decoding the occupancy map at a first resolution, determining a scale factor as a function of the first resolution, upscaling the occupancy map by the scale factor, using a neural network.

According to another aspect, there is provided an apparatus, comprising one or more processors, wherein the one or more processors are configured to reconstruct an occupancy map comprising occupancy data of a volumetric content, wherein reconstructing the occupancy map comprises decoding the occupancy map at a first resolution, determining a scale factor as a function of the first resolution, upscaling the occupancy map by the scale factor, using a neural network.

According to another aspect, there is provided an apparatus, comprising means for reconstructing an occupancy map comprising occupancy data of a volumetric content, means for decoding the occupancy map at a first resolution, means for determining a scale factor as a function of the first resolution, and means for upscaling the occupancy map by the scale factor, using a neural network.

According to another aspect, there is provided a bitstream comprising coded data representative of at least an occupancy map comprising occupancy data of a volumetric content, wherein the bitstream further comprises an information indicating whether the occupancy map is to be upscaled by a scale factor using a neural network or another upscaling method.

According to another aspect, there is provided a method, comprising encoding an occupancy map comprising occupancy data of a volumetric content, wherein encoding the occupancy map comprises downscaling the occupancy map at a first resolution, encoding the downscaled occupancy map, encoding an information indicating whether the occupancy map is to be upscaled using a neural network or another upscaling method for reconstructing the occupancy map.

According to another aspect, there is provided an apparatus, comprising one or more processors, wherein the one or more processors are configured to encode an occupancy map comprising occupancy data of a volumetric content, wherein encoding the occupancy map comprises downscaling the occupancy map at a first resolution, encoding the downscaled occupancy map, encoding an information indicating whether the occupancy map is to be upscaled using a neural network or another upscaling method for reconstructing the occupancy map.

One or more of at least one of embodiment also provide a device, a computer program product and a non-transitory computer readable medium.

The specific nature of at least one of the present embodiments as well as other objects, advantages, features and uses of said at least one of the present embodiments will become evident from the following description of examples taken in conjunction with the accompanying drawings.

BRIEF DESCRIPTION OF DRAWINGS

In the drawings, examples of several embodiments are illustrated. The drawings show.

DETAILED DESCRIPTION

Figure 1:
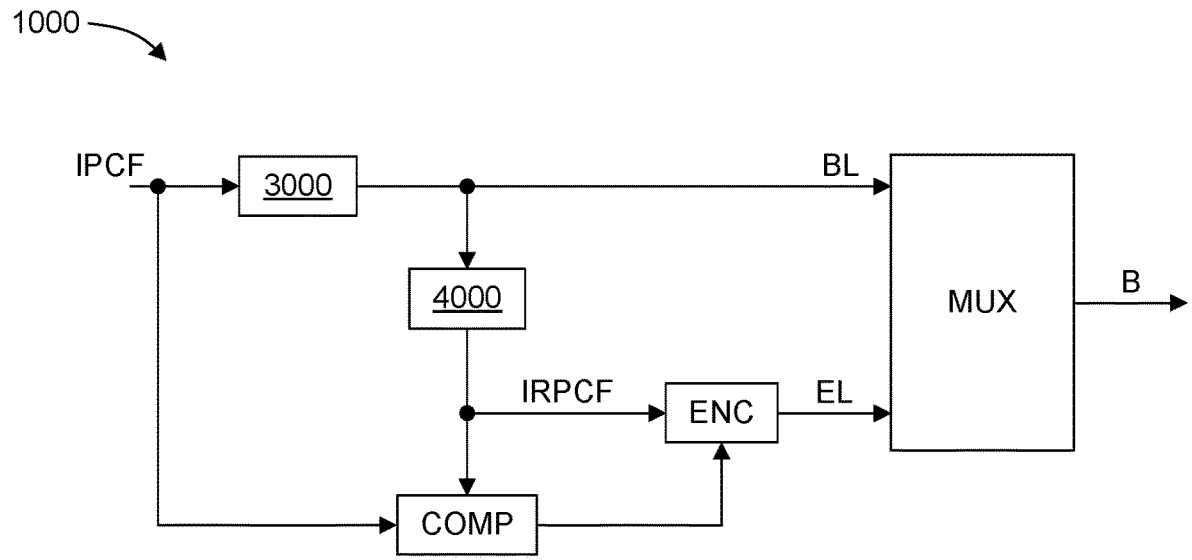
FIG. 1 illustrates a schematic block diagram of an example of a two-layer-based point cloud encoding structure in accordance with at least one of the present embodiments.

At least one of the present embodiments is described more fully hereinafter with reference to the accompanying figures, in which examples of at least one of the present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Similar or same elements of figures are referenced with the same reference numbers.

The aspects described and contemplated below may be implemented in many different forms. FIGS. 1-7 below provide some embodiments, but other embodiments are contemplated and the discussion of FIGS. 1-7 does not limit the breadth of the implementations.

At least one of the aspects generally relates to point cloud encoding and decoding, and at least one other aspect generally relates to transmitting a bitstream generated or encoded.

More precisely, various methods and other aspects described herein may be used to implement modules, for example, the present embodiments could be implemented by a kind of mixer/combiner of the geometry RG (output of the geometry generating module GGM, module 4500) and the reconstructed point cloud RPCF (IRPCF) (output of the texture generating module TGM, module 4600).

Moreover, the present aspects are not limited to MPEG standards such as MPEG-I part 5 that relates to the Point Cloud Compression, and may be applied, for example, to other standards and recommendations, whether pre-existing or future-developed, and extensions of any such standards and recommendations (including MPEG-I part 5). Unless indicated otherwise, or technically precluded, the aspects described in this application may be used individually or in combination.

In the following, image data refer to data, for example, one or several arrays of 2D samples in a specific image/video format. A specific image/video format may specify information pertaining to pixel values of an image (or a video). A specific image/video format may also specify information which may be used by a display and/or any other apparatus to visualize and/or decode an image (or video) for example. An image typically includes a first component (a.k.a. channel), in the shape of a first 2D array of samples, usually representative of luminance (or luma) of the image. An image may also include a second component and a third component, in the shape of other 2D arrays of samples, usually representative of the chrominance (or chroma) of the image. Such images are usually denoted 3-channels image, such as, for example, the traditional tri-chromatic RGB image or YCbCr/YUV image.

A pixel value is represented in one or more embodiments by a vector of C values, where C is the number of components (channels). Each value of a vector is typically represented with a number of bits which may define a dynamic range of the pixel values.

An image block means a set of pixels which belong to an image. The pixel values of an image block (or image block data) refer to the values of the pixels which belong to this image block. An image block may have an arbitrary shape, although rectangles are common.

A point cloud may be represented by a dataset of 3D samples within a 3D volumetric space that have unique coordinates and that may also have one or more attributes.

A 3D sample of this data set may be defined by its spatial location (X, Y, and Z coordinates in a 3D space) and possibly by one or more associated attributes such as a color, represented in the RGB or YUV color space for example, a transparency, a reflectance, a two-component normal vector or any feature representing a feature of this sample. For example, a 3D sample may be defined by 6 components (X, Y, Z, R, G, B) or equivalently (X, Y, Z, y, U, V) where (X,Y,Z) defines the coordinates of a point in a 3D space and (R,G,B) or (y,U,V) defines a color of this 3D sample. The same type of attribute may be present multiple times. For example, multiple color attributes may provide color information from different points of view.

A point cloud may be static or dynamic depending on whether or not the cloud changes with respect to time. A static point cloud or an instance of a dynamic point cloud is usually denoted as a point cloud frame. It should be noticed that in the case of a dynamic point cloud, the number of points is generally not constant but, on the contrary, generally changes with time. More generally, a point cloud may be considered as dynamic if anything changes with time, such as, for example, the number of points, the position of one or more points, or any attribute of any point.

As an example, a 2D sample may be defined by 6 components (u, v, Z, R, G, B) or equivalently (u, v, Z, y, U, V). (u,v) defines the coordinates of a 2D sample in a 2D space of the projection plane. Z is the depth value of a projected 3D sample onto this projection plane. (R,G,B) or (y,U,V) defines a color of this 3D sample.

FIG. 1 illustrates a schematic block diagram of an example of a two-layer-based point cloud encoding structure 1000 in accordance with at least one of the present embodiments.

The two-layer-based point cloud encoding structure 1000 may provide a bitstream B representative of an input point cloud frame IPCF. Possibly, said input point cloud frame IPCF represents a frame of a dynamic point cloud. Then, a frame of said dynamic point cloud may be encoded by the two-layer-based point cloud encoding structure 1000 independently from another frame.

Basically, the two-layer-based point cloud encoding structure 1000 may provide ability to structure the bitstream B as a Base Layer BL and an Enhancement Layer EL. The base layer BL may provide a lossy representation of an input point cloud frame IPCF and the enhancement layer EL may provide a higher quality (possibly lossless) representation by encoding isolated points not represented by the base layer BL.

Figure 3:
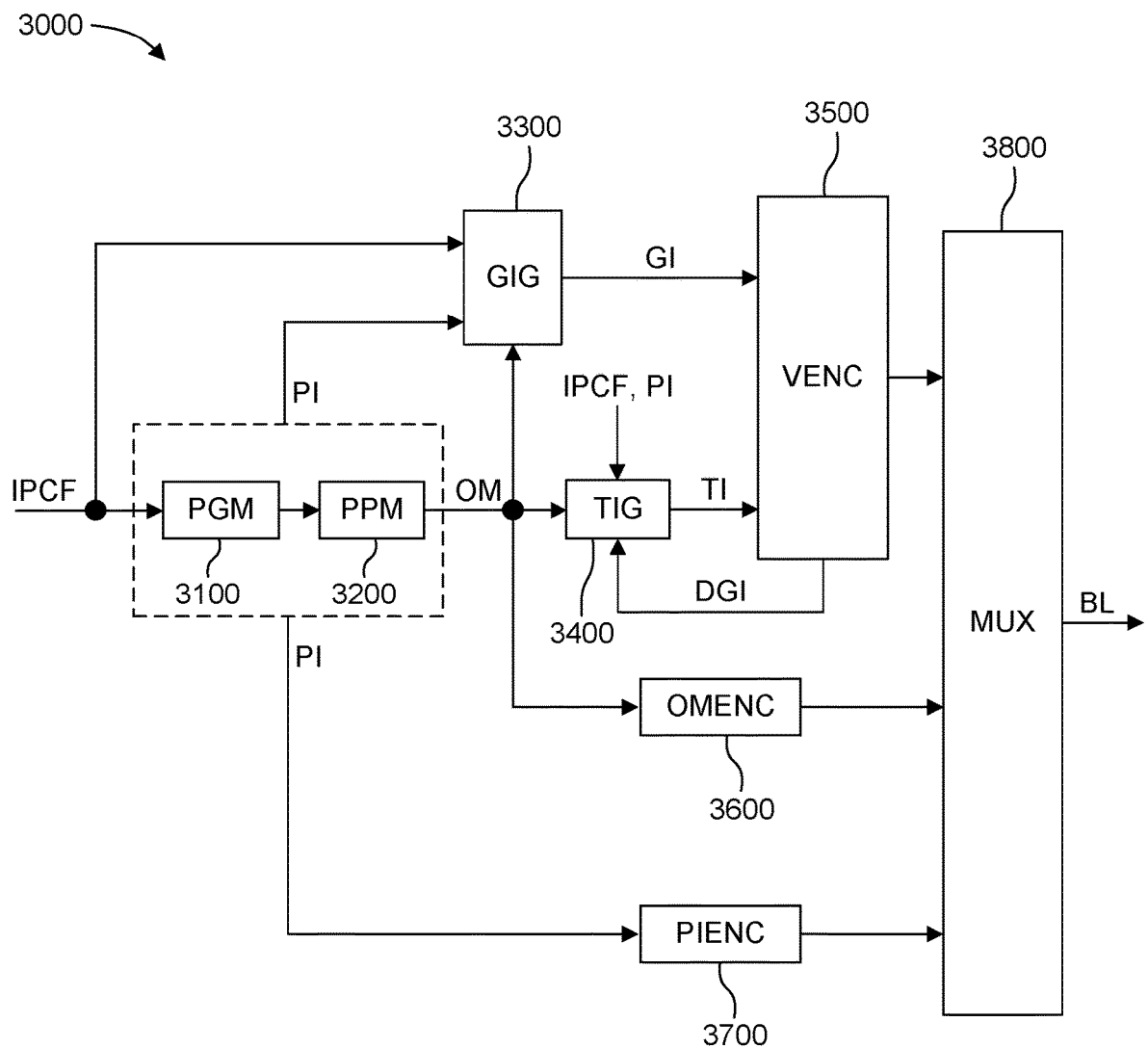
FIG. 3 illustrates a schematic block diagram of an example of an image-based point cloud encoder in accordance with at least one of the present embodiments.
Figure 4:
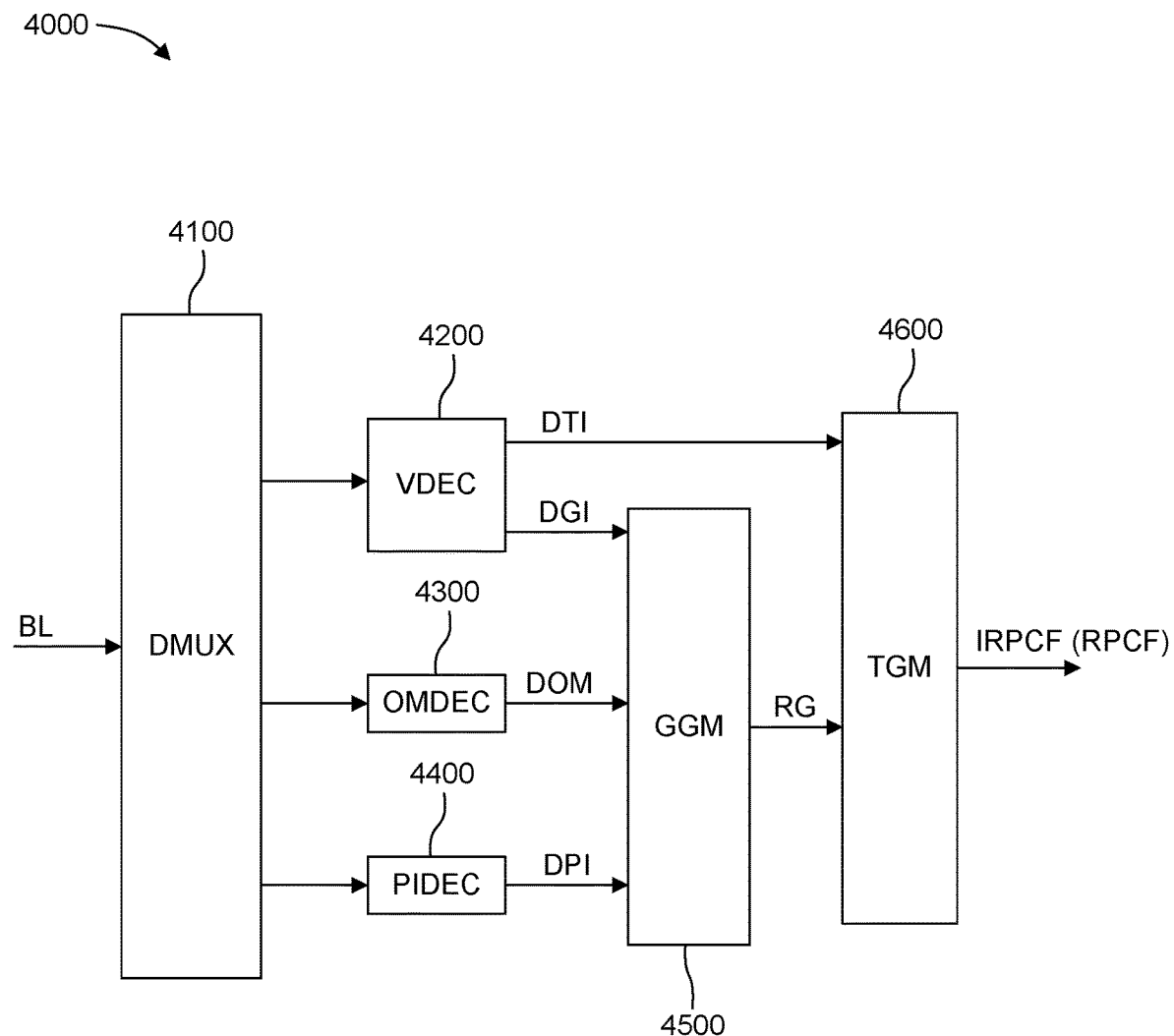
FIG. 4 illustrates a schematic block diagram of an example of an image-based point cloud decoder in accordance with at least one of the present embodiments.

The base layer BL may be provided by an image-based encoder 3000 as illustrated in FIG. 3. Said image-based encoder 3000 may provide geometry/texture images representing the geometry/attributes of 3D samples of the input point cloud frame IPCF. It may allow isolated 3D samples to be discarded. The base layer BL may be decoded by an image-based decoder 4000 as illustrated in FIG. 4 that may provide an intermediate reconstructed point cloud frame IRPCF.

Then, back to the two-layer-based point cloud encoding 1000 in FIG. 1, a comparator COMP may compare the 3D samples of the input point cloud frame IPCF to the 3D samples of the intermediate reconstructed point cloud frame IRPCF in order to detect/locate missed/isolated 3D samples. Next, an encoder ENC may encode the missed 3D samples and may provide the enhancement layer EL. Finally, the base layer BL and the enhancement layer EL may be multiplexed together by a multiplexer MUX so as to generate the bitstream B.

According to an embodiment, the encoder ENC may comprise a detector that may detect and associate a 3D reference sample R of the intermediate reconstructed point cloud frame IRPCF to a missed 3D samples M.

For example, a 3D reference sample R associated with a missed 3D sample M may be its nearest neighbor of M according to a given metric.

According to an embodiment, the encoder ENC may then encode the spatial locations of the missed 3D samples M and their attributes as differences determined according to spatial locations and attributes of said 3D reference samples R.

In a variant, those differences may be encoded separately.

For example, for a missed 3D sample M, with spatial coordinates x(M), y(M) and z(M), a x-coordinate position difference Dx(M), a y-coordinate position difference Dy(M), a z-coordinate position difference Dz(M), a R-attribute component difference Dr(M), a G-attribute component difference Dg(M) and the B-attribute component difference Db(M) may be calculated as follows:

$$Dx(M)=x(M)-x(R),$$

where x(M) is the x-coordinate of the 3D sample M, respectively R in a geometry image provided by FIG. 3, $$Dy(M)=y(M)-y(R)$$

where y(M) is the y-coordinate of the 3D sample M, respectively R in a geometry image provided by FIG. 3, $$Dz(M)=z(M)-z(R)$$

where z(M) is the z-coordinate of the 3D sample M, respectively R in a geometry image provided by FIG. 3, $$Dr(M)=R(M)-R(R).$$

where R(M), respectively R(R) is the r-color component of a color attribute of the 3D sample M, respectively R, $$Dg(M)=G(M)-G(R).$$

where G(M), respectively G(R) is the g-color component of a color attribute of the 3D sample M, respectively R, $$Db(M)=B(M)-B(R).$$

where B(M), respectively B(R) is the b-color component of a color attribute of the 3D sample M, respectively R.

Figure 2:
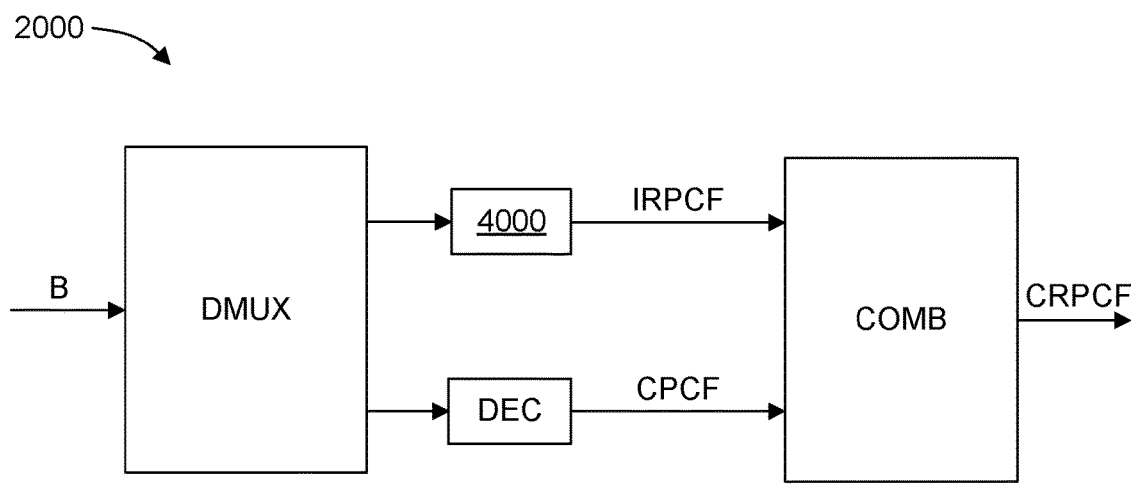
FIG. 2 illustrates a schematic block diagram of an example of a two-layer-based point cloud decoding structure in accordance with at least one of the present embodiments.

FIG. 2 illustrates a schematic block diagram of an example of a two-layer-based point cloud decoding structure 2000 in accordance with at least one of the present embodiments.

The behavior of the two-layer-based point cloud decoding structure 2000 depends on its capabilities.

A two-layer-based point cloud decoding structure 2000 with limited capabilities may access only the base layer BL from the bitstream B by using a de-multiplexer DMUX, and then may provide a faithful (but lossy) version IRPCF of the input point cloud frame IPCF by decoding the base layer BL by a point cloud decoder 4000 as illustrated in FIG. 4.

A two-layer-based point cloud decoding structure 2000 with full capabilities may access both the base layer BL and the enhancement layer EL from the bitstream B by using the de-multiplexer DMUX. The point cloud decoder 4000, as illustrated in FIG. 4, may determine the intermediate reconstructed point cloud frame IRPCF from the base layer BL. The decoder DEC may determine a complementary point cloud frame CPCF from the enhancement layer EL. A combiner COMB then may combine together the intermediate reconstructed point cloud frame IRPCF and the complementary point cloud frame CPCF to therefore provide a higher quality (possibly lossless) representation (reconstruction) CRPCF of the input point cloud frame IPCF.

FIG. 3 illustrates a schematic block diagram of an example of an image-based point cloud encoder 3000 in accordance with at least one of the present embodiments.

The image-based point cloud encoder 3000 leverages existing video codecs to compress the geometry and texture (attribute) information of a dynamic point cloud. This is accomplished by essentially converting the point cloud data into a set of different video sequences.

In particular embodiments, two videos, one for capturing the geometry information of the point cloud data and another for capturing the texture information, may be generated and compressed using existing video codecs. An example of an existing video codec is the HEVC Main profile encoder/decoder (ITU-T H.265 Telecommunication standardization sector of ITU (February 2018), series H: audiovisual and multimedia systems, infrastructure of audiovisual services—coding of moving video, High efficiency video coding, Recommendation ITU-T H.265).

Additional metadata that are used to interpret the two videos are typically also generated and compressed separately. Such additional metadata includes, for example, an occupancy map OM and/or auxiliary patch information PI.

The generated video bitstreams and the metadata may be then multiplexed together so as to generate a combined bitstream.

It should be noted that the metadata typically represents a small amount of the overall information. The bulk of the information is in the video bitstreams.

An example of such a point cloud coding/decoding process is given in *Text of ISO/IEC FDIS* 23090-5 *Visual Volumetric Video-based Coding and Video-based point cloud compression*, ISO/IEC JTC 1/SC 29/WG 11/MPEG-I 3DG, w19579.

In step 3100, a module PGM may generate at least one patch by decomposing 3D samples of a data set representative of the input point cloud frame IPCF to 2D samples on a projection plane using a strategy that provides best compression.

A patch may be defined as a set of 2D samples.

For example, in V-PCC, a normal at every 3D sample is first estimated as described, for example, in Hoppe et al. (Hugues Hoppe, Tony DeRose, Tom Duchamp, John McDonald, Werner Stuetzle. Surface reconstruction from unorganized points. *ACM SIGGRAPH* 1992 *Proceedings*, 71-78). Next, an initial clustering of the input point cloud frame IPCF is obtained by associating each 3D sample with one of the six oriented planes of a 3D bounding box encompassing the 3D samples of the input point cloud frame IPCF. More precisely, each 3D sample is clustered and associated with an oriented plane that has the closest normal (that is maximizes the dot product of the point normal and the plane normal). Then the 3D samples are projected to their associated planes. A set of 3D samples that forms a connected area in their plane is referred as a connected component. A connected component is a set of at least one 3D sample having similar normal and a same associated oriented plane. The initial clustering is then refined by iteratively updating the cluster associated with each 3D sample based on its normal and the clusters of its nearest neighboring samples. The final step consists of generating one patch from each connected component, that is done by projecting the 3D samples of each connected component onto the oriented plane associated with said connected component. A patch is associated with auxiliary patch information PI that represents auxiliary patch information defined for each patch to interpret the projected 2D samples that correspond to the geometry and/or attribute information.

In V-PCC, for example, the auxiliary patch information PI includes 1) information indicating one of the six oriented planes of a 3D bounding box encompassing the 3D samples of a connected component; 2) information relative to the plane normal; 3) information determining the 3D location of a connected component relative to a patch represented in terms of depth, tangential shift and bi-tangential shift; and 4) information such as coordinates (u0, v0, u1, v1) in a projection plane defining a 2D bounding box encompassing a patch.

In step 3200, a patch packing module PPM may map (place) at least one generated patch onto a 2D grid (also called canvas) without any overlapping in a manner that typically minimizes the unused space, and may guarantee that every T×T (for example, 16×16) block of the 2D grid is associated with a unique patch. A given minimum block size T×T of the 2D grid may specify the minimum distance between distinct patches as placed on this 2D grid. The 2D grid resolution may depend on the input point cloud size and its width W and height H and the block size T may be transmitted as metadata to the decoder.

The auxiliary patch information PI may further include information relative to an association between a block of the 2D grid and a patch.

In V-PCC, the auxiliary information PI may include a block-to-patch-index information (BlockToPatch) that determines an association between a block of the 2D grid and a patch index.

Figure 3A:
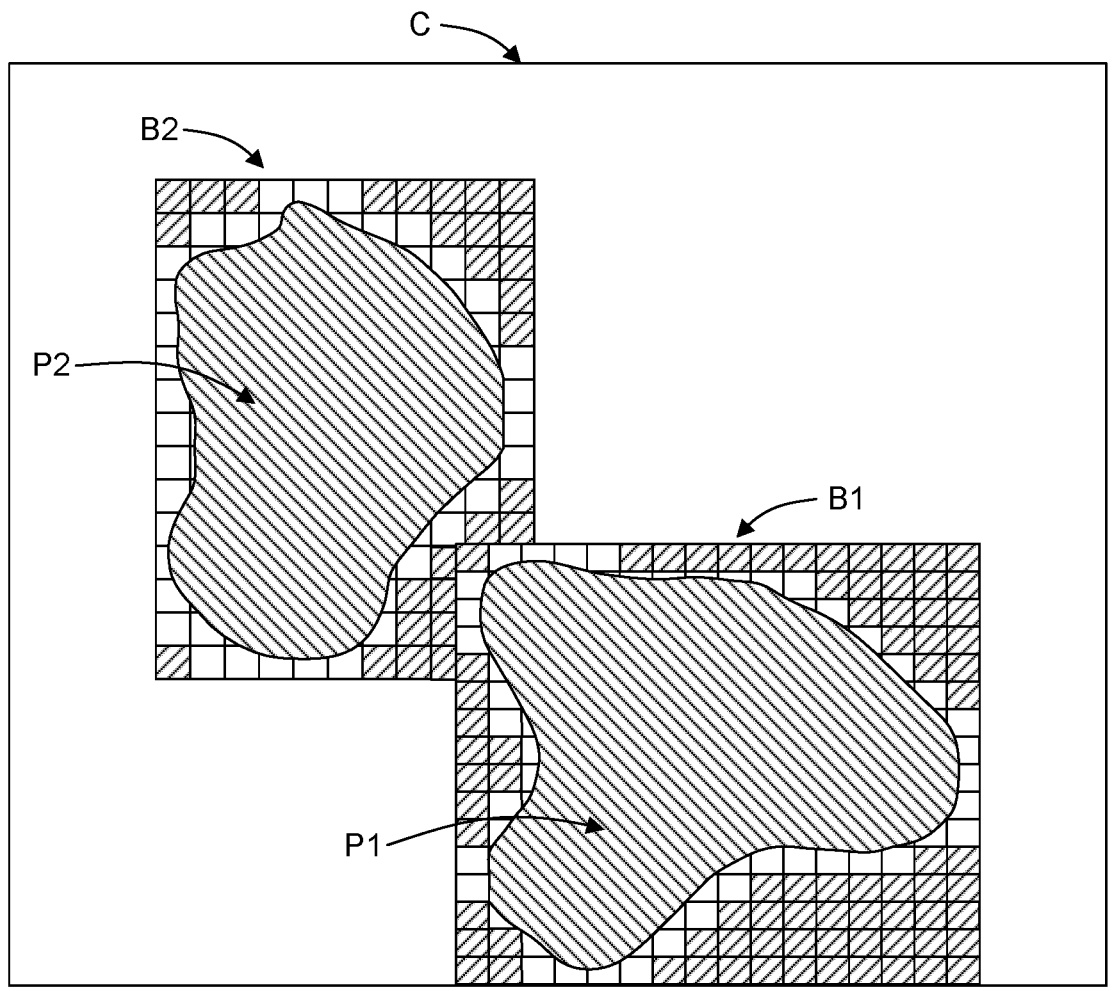
FIG. 3a illustrates an example of a canvas comprising 2 patches and their 2D bounding boxes.

FIG. 3*a* illustrates an example of a canvas C comprising 2 patches P1 and P2 and their associated 2D bounding boxes B1 and B2. Note that two bounding boxes may overlap in the canvas C as illustrated on FIG. 3*a*. The 2D grid (the splitting of the canvas) is only represented inside the bounding box but the splitting of the canvas also occurs outside those bounding boxes. A bounding box associated with a patch can be split into T×T blocks, typically T=16.

T×T blocks containing 2D samples belonging to a patch may be considered as occupied blocks. Each occupied block of the canvas is represented by a particular pixel value (for example 1) in the occupancy map OM (three-channels image) and each unoccupied block of the canvas is represented by another particular value, for example 0. Then, a pixel value of the occupancy map OM may indicate whether a T×T block of the canvas is occupied, that is contains 2D samples that belong to a patch.

In FIG. 3*a*, an occupied block is represented by a white block and light grey blocks represent unoccupied blocks. The image generation processes (steps 3300 and 3400) exploit the mapping of the at least one generated patch onto the 2D grid computed during step 3200, to store the geometry and texture of the input point cloud frame IPCF as images.

In step 3300, a geometry image generator GIG may generate at least one geometry image GI from the input point cloud frame IPCF, the occupancy map OM and the auxiliary patch information PI. The geometry image generator GIG may exploit the occupancy map information in order to detect (locate) the occupied blocks and thus the non-empty pixels in the geometry image GI.

A geometry image GI may represent the geometry of the input point cloud frame IPCF and may be a monochromatic image of W×H pixels represented, for example, in YUV420-8 bit format.

In order to better handle the case of multiple 3D samples being projected (mapped) to a same 2D sample of the projection plane (along a same projection direction (line)), multiple images, referred to as layers, may be generated. Thus, different depth values D1, . . . , Dn may be associated with a 2D sample of a patch and multiple geometry images may then be generated.

In V-PCC, 2D samples of a patch are projected onto two layers. A first layer, also called the near layer, may store, for example, the depth values D0 associated with the 2D samples with smaller depths. A second layer, referred to as the far layer, may store, for example, the depth values D1 associated with the 2D samples with larger depths. Alternatively, the second layer may store difference values between depth values D1 and D0. For example, the information stored by the second depth image may be within an interval $[0, \Delta]$ corresponding to depth values in the range $[D0, D0+\Delta]$, where $\Delta$ is a user-defined parameter that describes the surface thickness.

By this way, the second layer may contain significant contour-like high frequency features. Thus, it clearly appears that the second depth image may be difficult to code by using a legacy video coder and, therefore, the depth values may be poorly reconstructed from said decoded second depth image, which results on a poor quality of the geometry of the reconstructed point cloud frame.

According to an embodiment, the geometry image generating module GIG may code (derive) depth values associated with 2D samples of the first and second layers by using the auxiliary patch information PI.

In V-PCC, the location of a 3D sample in a patch with a corresponding connected component may be expressed in terms of depth $\delta(u, v)$, tangential shift $s(u, v)$ and bi-tangential shift $r(u, v)$ as follows:

$$\delta(u,v)=\delta 0+g(u,v)$$

$$s(u,v)=s0-u0+u$$

$$r(u,v)=r0-v0+v$$

where $g(u, v)$ is the luma component of the geometry image, $(u,v)$ is a pixel associated with the 3D sample on a projection plane, $(\delta 0, s0, r0)$ is the 3D location of the corresponding patch of a connected component to which the 3D sample belongs and $(u0, v0, u1, v1)$ are the coordinates in said projection plane defining a 2D bounding box encompassing the projection of the patch associated with said connected component.

Thus, a geometry image generating module GIG may code (derive) depth values associated with 2D samples of a layer (first or second or both) as a luma component $g(u,v)$ given by: $g(u,v)=\delta(u, v)-\delta 0$. It is noted that this relationship may be employed to reconstruct 3D sample locations $(\delta 0, s0, r0)$ from a reconstructed geometry image $g(u, v)$ with the accompanying auxiliary patch information PI.

According to an embodiment, a projection mode may be used to indicate if a first geometry image GI0 may store the depth values of the 2D samples of either the first or second layer and a second geometry image GI1 may store the depth values associated with the 2D samples of either the second or first layer.

For example, when a projection mode equals 0, then the first geometry image GI0 may store the depth values of 2D samples of the first layer and the second geometry image GI1 may store the depth values associated with 2D samples of the second layer. Reciprocally, when a projection mode equals 1, then the first geometry image GI0 may store the depth values of 2D samples of the second layer and the second geometry image GI1 may store the depth values associated with 2D samples of the first layer.

According to an embodiment, a frame projection mode may be used to indicate if a fixed projection mode is used for all the patches or if a variable projection mode is used in which each patch may use a different projection mode. The projection mode and/or the frame projection mode may be transmitted as metadata.

According to an embodiment, when the frame projection indicates that a variable projection mode may be used, a patch projection mode may be used to indicate the appropriate mode to use to (de-)project a patch.

A patch projection mode may be transmitted as metadata and may be, possibly, an information included in the auxiliary patch information PI.

According to an embodiment of step 3300, the pixel value in a first geometry image, for example GI0, corresponding to a 2D sample (u,v) of a patch, may represent the depth value of least one in-between 3D sample defined along a projection line corresponding to said 2D sample (u,v). More precisely, said in-between 3D samples reside along a projection line and share the same coordinates of the 2D sample (u,v) whose depth value D1 is coded in a second geometry image, for example GI1. Further, the said in-between 3D samples may have depth values between the depth value D0 and a depth value D1. A designated bit may be associated with each said in-between 3D samples which is set to 1 if the in-between 3D sample exists and 0 otherwise.

Figure 3B:
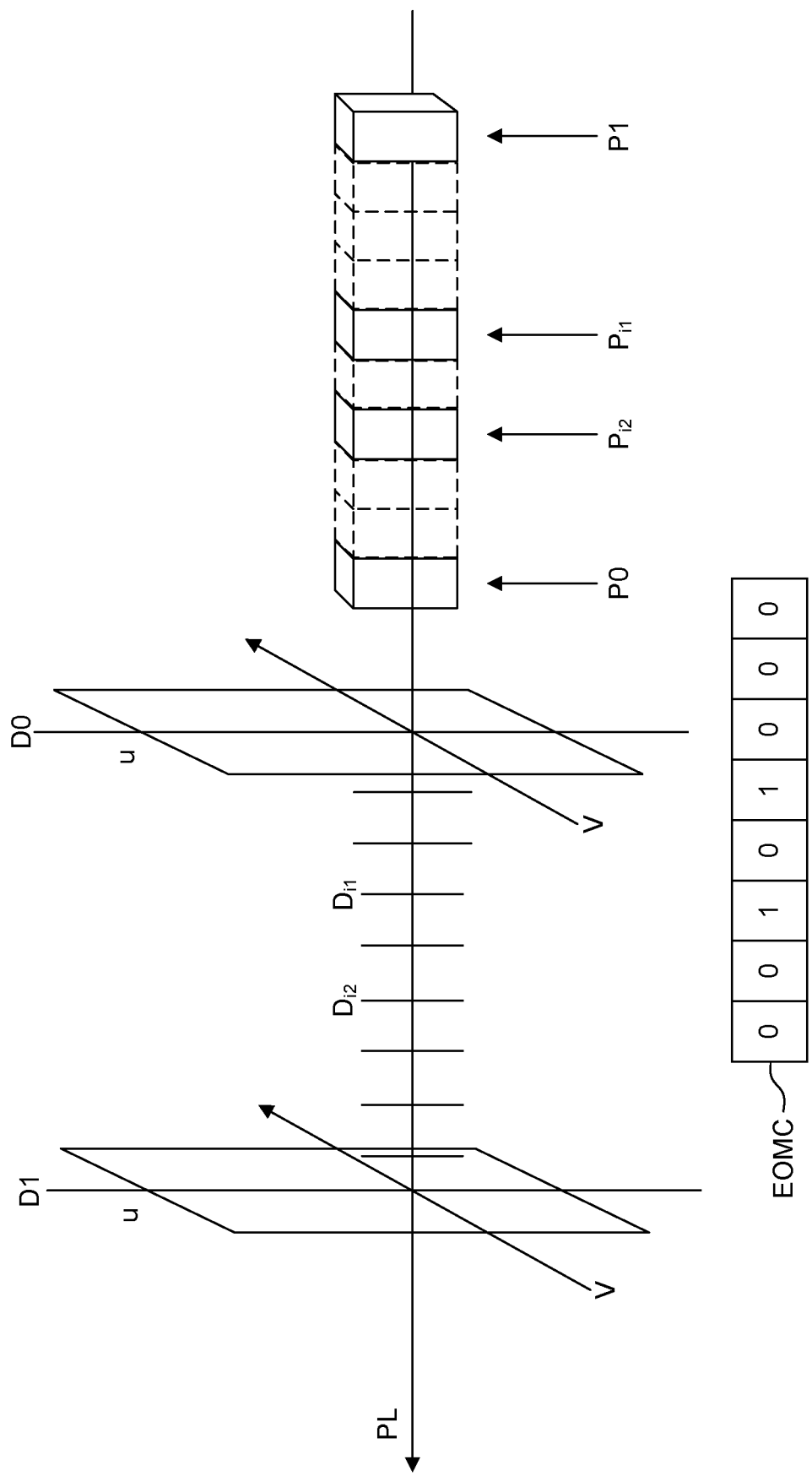
FIG. 3b illustrates an example of two in-between 3D samples located between two 3D samples along a projection line.

FIG. 3b illustrates an example of two in-between 3D samples $P_{i1}$, and $P_{i2}$ located between two 3D samples P0 and P1 along a projection line PL. The 3D samples P0 and P1 have respectively depth values equal to D0 and D1. The depth values $D_{i1}$ and $D_{i2}$ of respectively the two in-between 3D samples $P_{i1}$ and $P_{i2}$ are greater than D0 and lower than D1.

Then, all said designated bits along said projection line may be concatenated to form a codeword, denoted Enhanced-Occupancy map (EOM) codeword hereafter. As illustrated in FIG. 3b, assuming an EOM codeword of 8 bits of length, 2 bits equal 1 to indicate the location of the two 3D samples $P_{i1}$ and $P_{i2}$. Finally, all the EOM codewords may be packed in an image, for example, the occupancy map OM. In that case, at least one patch of the canvas may contain at least one EOM codeword. Such a patch is denoted reference patch and a block of a reference patch is denoted a EOM reference block. Thus, a pixel value of the occupancy map OM may equal to a first value, for example 0, to indicate an unoccupied block of the canvas, or another value, for example greater than 0, to indicate either a occupied block of the canvas, for example when D1−D0<=1, or to indicate a EOM reference block of the canvas when, for example D1−D0>1.

The locations of pixels in the occupancy map OM that indicates EOM reference blocks and the values of the bits of a EOM codeword that are obtained from the values of those pixels, indicate the 3D coordinates of the in-between 3D samples.

In step 3400, a texture image generator TIG may generate at least one texture image TI from the input point cloud frame IPCF, the occupancy map OM, the auxiliary patch information PI and a geometry of a reconstructed point cloud frame derived from at least one decoded geometry image DGI, output of a video decoder VDEC (step 4200 in FIG. 4).

A texture image TI is a three-channels image that may represent the texture of the input point cloud frame IPCF and may be an image of W×H pixels represented, for example, in YUV420-8 bit format or in RGB444-8 bit format.

The texture image generator TG may exploit the occupancy map information in order to detect (locate) the occupied blocks and thus the non-empty pixels in the texture image.

The texture image generator TIG may be adapted to generate and associate a texture image TI with each geometry image/layer DGI.

According to an embodiment, the texture image generator TIG may code (store) the texture (attribute) values T0 associated with 2D samples of the first layer as pixel values of a first texture image TI0 and the texture values T1 associated with the 2D samples of the second layer as pixel values of a second texture image TI1.

Alternatively, the texture image generating module TIG may code (store) the texture values T1 associated with 2D samples of the second layer as pixel values of the first texture image TI0 and the texture values D0 associated with the 2D samples of the first layer as pixel values of the second geometry image GI1.

For example, colors of 3D samples may be obtained as described in section 9.5 Attribute video decoding process of w19579.

The texture values of two 3D samples are stored in either the first or second texture images. But, the texture values of in-between 3D samples cannot be stored neither in this first texture image TI0 nor the second texture image TI1 because the locations of the projected in-between 3D samples correspond to occupied blocs that are already used for storing a texture value of another 3D sample (P0 or P1) as illustrated in FIG. 3b. The texture values of in-between 3D samples are thus stored in EOM texture blocks located elsewhere in either the first or second texture image in locations procedurally defined for example in section 9.5 Attribute Video decoding process of w19579. In brief, this process determines locations of unoccupied blocks in a texture image and stored the texture values associated with in-between 3D samples as pixel values of said unoccupied blocks of the texture image, denoted EOM texture blocks.

According to an embodiment, a padding process may be applied on the geometry and/or texture image. The padding process may be used to fill empty space between patches to generate a piecewise smooth image suited for video compression.

In step 3500, a video encoder VENC may encode the generated images/layers TI and GI.

In step 3600, an encoder OMENC may encode the occupancy map as an image as detailed, for example, in section H9.3 Occupancy video decoding process in w19579. Lossy or lossless encoding may be used.

According to an embodiment, the video encoder ENC and/or OMENC may be a HEVC-based encoder.

In step 3700, an encoder PIENC may encode the auxiliary patch information PI and possibly additional metadata such as the block size T, the width W and height H of the geometry/texture images.

According to an embodiment, the auxiliary patch information may be differentially encoded (as defined, for example in section H.9.6 sub-bitstream extraction process in w19579).

In step 3800, a multiplexer may be applied to the generated outputs of steps 3500, 3600 and 3700, and as a result these outputs may be multiplexed together so as to generate a bitstream representative of the base layer BL. It should be noted that the metadata information represents a small fraction of the overall bitstream. The bulk of the information is compressed using the video codecs.

FIG. 4 illustrates a schematic block diagram of an example of an image-based point cloud decoder 4000 in accordance with at least one of the present embodiments.

In step 4100, a de-multiplexer DMUX may applied to demultiplex the encoded information of the bitstream representative of the base layer BL.

In step 4200, a video decoder VDEC may decode encoded information to derive at least one decoded geometry image DGI and at least one decoded texture image DTI.

In step 4300, a decoder OMDEC may decode encoded information to derive a decoded occupancy map DOM.

According to an embodiment, the video decoder VDEC and/or OMDEC may be a HEVC-based decoder.

In step 4400, a decoder PIDEC may decode encoded information to derive auxiliary patch information DPI.

Possibly, metadata may also be derived from the bitstream BL.

In step 4500, a geometry generating module GGM may derive the geometry RG of a reconstructed point cloud frame IRPCF from the at least one decoded geometry image DGI, the decoded occupancy map DOM, the decoded auxiliary patch information DPI and possible additional metadata.

The geometry generating module GGM may exploit the decoded occupancy map information DOM in order to locate the non-empty pixels in the at least one decoded geometry image DG.

Said non-empty pixels belong to either occupied blocks or EOM reference blocks depending on pixels values of the decoded occupancy information DOM and value of D1–D0 as explained above.

According to an embodiment of step 4500, the geometry generating module GGM may derive two of the 3D coordinates of in-between 3D samples from coordinates of non-empty pixels.

According to an embodiment of step 4500, when said non-empty pixels belong to said EOM reference block, the geometry generating module GGM may derive the third of the 3D coordinates of in-between 3D samples from the bit values of the EOM codewords.

For example, according to the example of FIG. 3b, the EOM codeword EOMC is used for determining the 3D coordinates of in-between 3D samples $P_{i1}$ and $P_{i2}$. The third coordinate of the in-between 3D sample $P_{i1}$ may be derived, for example, from D0 by $D_{i1}=D0+3$ and the third coordinate of the reconstructed 3D sample $P_{i2}$ may be derived, for example, from D0 by $D_{i2}=D0+5$. The offset value (3 or 5) is the number of intervals between D0 and D1 along the projection line.

According to an embodiment, when said non-empty pixels belong to an occupied block, the geometry generating module GGM may derive the 3D coordinates of reconstructed 3D samples from coordinates of non-empty pixels, values of said non-empty pixels of one of the at least one decoded geometry image DGI, the decoded auxiliary patch information, and possibly, from additional metadata.

The use of non-empty pixels is based on 2D pixel relationship with 3D samples. For example, with the said projection in V-PCC, the 3D coordinates of reconstructed 3D samples may be expressed in terms of depth $\delta(u, v)$, tangential shift $s(u, v)$ and bi-tangential shift $r(u, v)$ as follows:

$$\delta(u,v)=\delta 0+g(u,v)$$

$$s(u,v)=s0-u0+u$$

$$r(u,v)=r0-v0+v$$

where g(u, v) is the luma component of a decoded geometry image DGI, (u,v) is a pixel associated with a reconstructed 3D sample, ($\delta 0$, s0, r0) is the 3D location of a connected component to which the reconstructed 3D sample belongs and (u0, v0, u1, v1) are the coordinates in a projection plane defining a 2D bounding box encompassing the projection of a patch associate with said connected component.

In step 4600, a texture generating module TGM may derive the texture of the reconstructed point cloud frame IRPCF from the geometry RG and the at least one decoded texture image DTI.

According to an embodiment of step 4600, the texture generating module TGM may derive the texture of non-empty pixels that belong to a EOM reference block from a corresponding EOM texture block. The locations of a EOM texture blocks in a texture image are procedurally defined for example in section H.11.3 reconstruction for EOM patches in w19579.

According to an embodiment of step 4600, the texture generating module TGM may derive the texture of non-empty pixels that belong to an occupied block directly as pixel values of either the first or second texture image.

Figure 5:
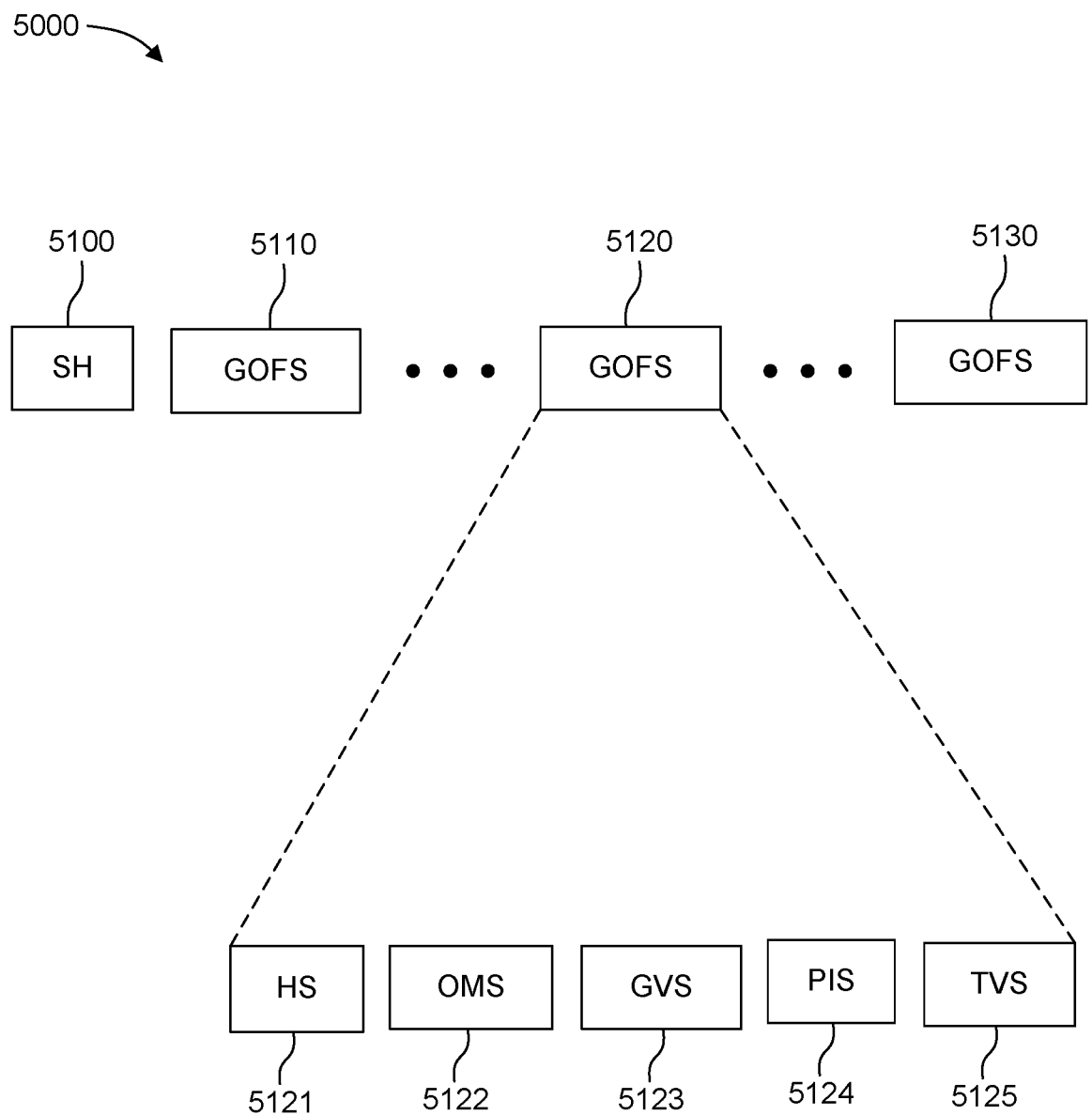
FIG. 5 illustrates schematically an example of syntax of a bitstream representative of a base layer BL in accordance with at least one of the present embodiments.

FIG. 5 illustrates schematically an example syntax of a bitstream representative of a base layer BL in accordance with at least one of the present embodiments.

The bitstream comprises a Bitstream Header SH and at least one Group Of Frame Stream GOFS.

A group of frame stream GOFS comprises a header HS, at least one syntax element OMS representative of an occupancy map OM, at least one syntax element GVS representative of at least one geometry image (or video), at least one syntax element TVS representative of at least one texture image (or video) and at least one syntax element PIS representative of auxiliary patch information and other additional metadata.

In a variant, a group of frame stream GOFS comprises at least one frame stream.

Figure 6:
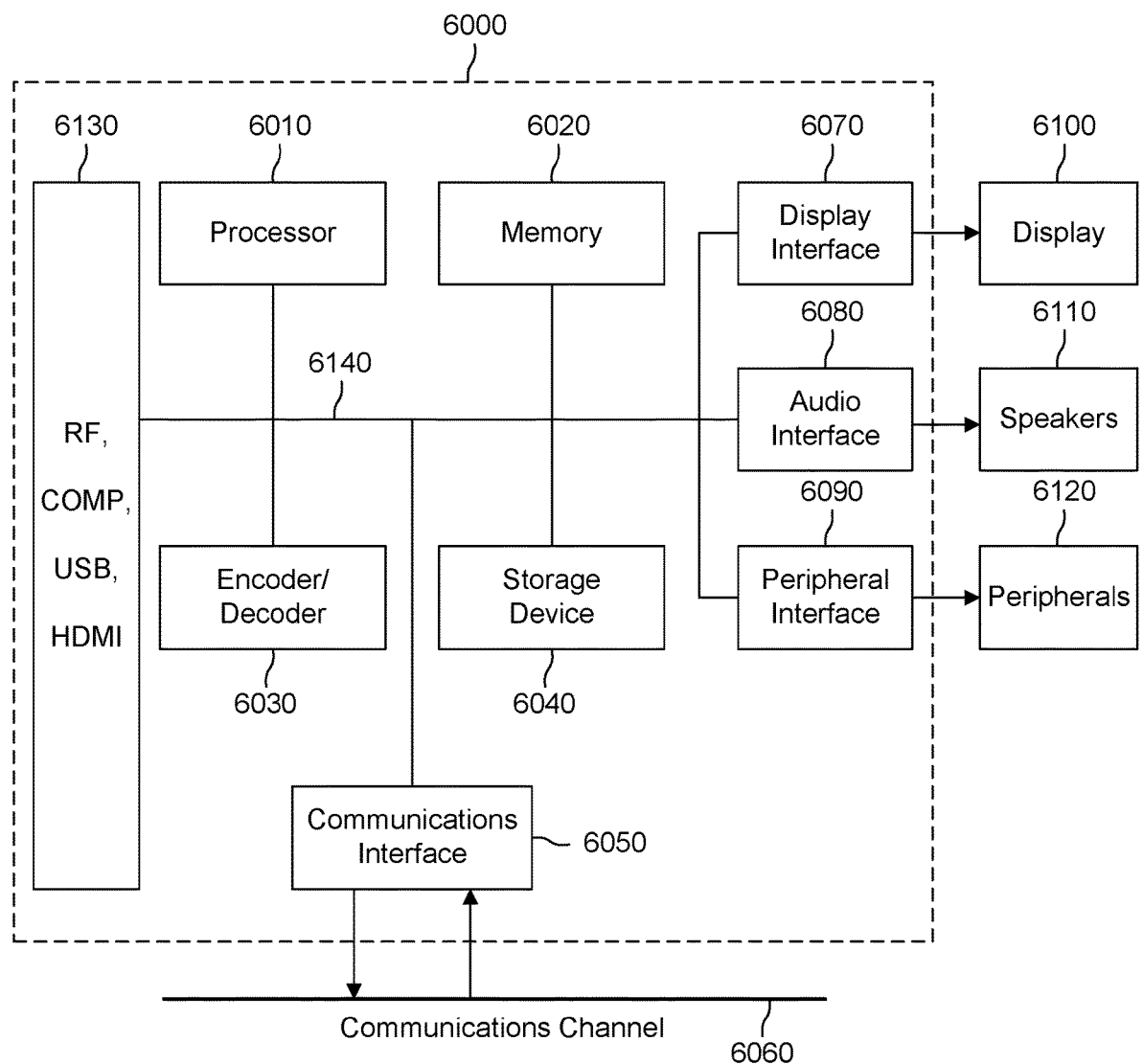
FIG. 6 illustrates a schematic block diagram of an example of a system in which various aspects and embodiments are implemented.

FIG. 6 shows a schematic block diagram illustrating an example of a system in which various aspects and embodiments are implemented.

System 6000 may be embodied as one or more devices including the various components described below and is configured to perform one or more of the aspects described in this document. Examples of equipment that may form all or part of the system 6000 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 6000, singly or in combination, may be embodied in a single integrated circuit, multiple ICs, and/or discrete components. For example, in at least one embodiment, the processing and encoder/decoder elements of system 6000 may be distributed across multiple ICs and/or discrete components. In various embodiments, the system 6000 may be communicatively coupled to other similar systems, or to other electronic devices, via, for example, a communications bus or through dedicated input and/or output ports. In various embodiments, the system 6000 may be configured to implement one or more of the aspects described in this document.

The system 6000 may include at least one processor 6010 configured to execute instructions loaded therein for implementing, for example, the various aspects described in this document. Processor 6010 may include embedded memory, input output interface, and various other circuitries as known in the art. The system 6000 may include at least one memory 6020 (for example a volatile memory device and/or a non-volatile memory device). System 6000 may include a storage device 6040, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 6040 may include an internal storage device, an attached storage device, and/or a network accessible storage device, as non-limiting examples.

The system 6000 may include an encoder/decoder module 6030 configured, for example, to process data to provide encoded data or decoded data, and the encoder/decoder module 6030 may include its own processor and memory. The encoder/decoder module 6030 may represent module(s) that may be included in a device to perform the encoding and/or decoding functions. As is known, a device may include one or both of the encoding and decoding modules. Additionally, encoder/decoder module 6030 may be implemented as a separate element of system 6000 or may be incorporated within processor 6010 as a combination of hardware and software as known to those skilled in the art.

Program code to be loaded onto processor 6010 or encoder/decoder 6030 to perform the various aspects described in this document may be stored in storage device 6040 and subsequently loaded onto memory 6020 for execution by processor 6010. In accordance with various embodiments, one or more of processor 6010, memory 6020, storage device 6040, and encoder/decoder module 6030 may store one or more of various items during the performance of the processes described in this document. Such stored items may include, but are not limited to, a point cloud frame, encoded/decoded geometry/texture videos/images or portions of the encoded/decoded geometry/texture video/images, a bitstream, matrices, variables, and intermediate or final results from the processing of equations, formulas, operations, and operational logic.

In several embodiments, memory inside of the processor 6010 and/or the encoder/decoder module 6030 may be used to store instructions and to provide working memory for processing that may be performed during encoding or decoding.

In other embodiments, however, a memory external to the processing device (for example, the processing device may be either the processor 6010 or the encoder/decoder module 6030) may be used for one or more of these functions. The external memory may be the memory 6020 and/or the storage device 6040, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), or VVC (Versatile Video Coding).

The input to the elements of system 6000 may be provided through various input devices as indicated in block 6130. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 6130 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 6000 to other electronic devices across USB and/or HDMI connections. It is to be understood that various aspects of input processing, for example, Reed-Solomon error correction, may be implemented, for example, within a separate input processing IC or within processor 6010 as necessary. Similarly, aspects of USB or HDMI interface processing may be implemented within separate interface ICs or within processor 6010 as necessary. The demodulated, error corrected, and demultiplexed stream may be provided to various processing elements, including, for example, processor 6010, and encoder/decoder 6030 operating in combination with the memory and storage elements to process the data stream as necessary for presentation on an output device.

Various elements of system 6000 may be provided within an integrated housing. Within the integrated housing, the various elements may be interconnected and transmit data therebetween using suitable connection arrangement 6140, for example, an internal bus as known in the art, including the I2C bus, wiring, and printed circuit boards.

The system 6000 may include communication interface 6050 that enables communication with other devices via communication channel 6060. The communication interface 6050 may include, but is not limited to, a transceiver configured to transmit and to receive data over communication channel 6060. The communication interface 6050 may include, but is not limited to, a modem or network card and the communication channel 6060 may be implemented, for example, within a wired and/or a wireless medium.

Data may be streamed to the system 6000, in various embodiments, using a Wi-Fi network such as IEEE 802.11. The Wi-Fi signal of these embodiments may be received over the communications channel 6060 and the communications interface 6050 which are adapted for Wi-Fi communications. The communications channel 6060 of these embodiments may be typically connected to an access point or router that provides access to outside networks including the Internet for allowing streaming applications and other over-the-top communications.

Other embodiments may provide streamed data to the system 6000 using a set-top box that delivers the data over the HDMI connection of the input block 6130.

Still other embodiments may provide streamed data to the system 6000 using the RF connection of the input block 6130.

It is to be appreciated that signaling may be accomplished in a variety of ways. For example, one or more syntax elements, flags, and so forth may be used to signal information to a corresponding decoder in various embodiments.

The system 6000 may provide an output signal to various output devices, including a display 6100, speakers 6110, and other peripheral devices 6120. The other peripheral devices 6120 may include, in various examples of embodiments, one or more of a stand-alone DVR, a disk player, a stereo system, a lighting system, and other devices that provide a function based on the output of the system 3000.

In various embodiments, control signals may be communicated between the system 6000 and the display 6100, speakers 6110, or other peripheral devices 6120 using signaling such as AV.Link (Audio/Video Link), CEC (Consumer Electronics Control), or other communications protocols that enable device-to-device control with or without user intervention.

The output devices may be communicatively coupled to system 6000 via dedicated connections through respective interfaces 6070, 6080, and 6090.

Alternatively, the output devices may be connected to system 6000 using the communications channel 6060 via the communications interface 6050. The display 6100 and speakers 6110 may be integrated in a single unit with the other components of system 6000 in an electronic device such as, for example, a television.

In various embodiments, the display interface 6070 may include a display driver, such as, for example, a timing controller (T Con) chip.

The display 6100 and speaker 6110 may alternatively be separate from one or more of the other components, for example, if the RF portion of input 6130 is part of a separate set-top box. In various embodiments in which the display 6100 and speakers 6110 may be external components, the output signal may be provided via dedicated output connections, including, for example, HDMI ports, USB ports, or COMP outputs.

As explained above, volumetric three-dimensional (3D) data are represented as a set of projections onto 2D components also called atlases: the occupancy map, geometry map, attribute map. Side metadata are also used for reconstructing the 3D point cloud model.

An atlas is compressed with a conventional 2D codec (e.g. AVC, HEVC or VVC . . . ). Moreover, to increase the compression gain, the occupancy map can be downscaled by a factor called occupancy map precision before encoding.

Figure 7:
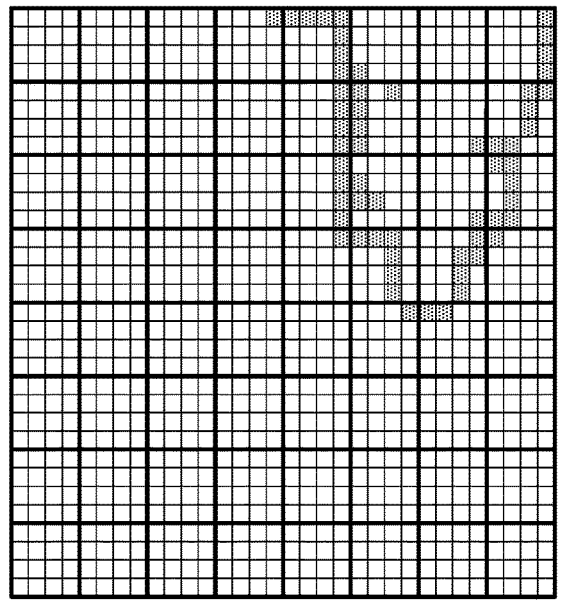
FIG. 7 illustrates an example of a source occupancy map (a), and a reconstructed occupancy map (b) from a downscaled occupancy map (c)
Figure 7:
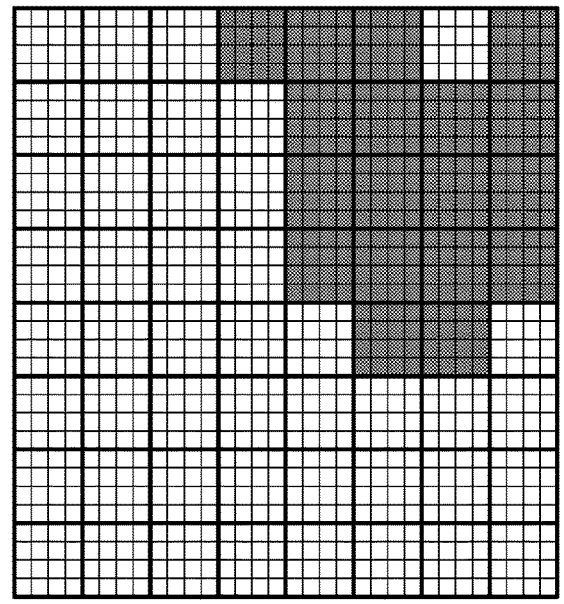

For reconstructing the point cloud, the decoder decodes the downscaled occupancy map and upscales it to its nominal resolution. FIG. 7 illustrates an example of an occupancy map (a) of a connected component of a source point cloud frame projected onto a plane, and the corresponding occupancy map reconstructed (b) in V-PCC when the occupancy map is downscaled by 4 (c).

When a block of the original projected point cloud is occupied in at least one pixel, the pixel of the occupancy map associated to this block is set to 1, thus leading to the reconstruction of numerous points when reconstructed at the decoding stage.

For instance, if occupancy precision is set to 4, the number of reconstructed points per block is 16. If the 4*4 block was almost full into the original point cloud, it is efficient to send an occupancy to one for the whole block.

However, if only one point occupies a 4×4 block on encoder side, the occupancy indicates the entire block as occupied and leads to the generation of 16 points instead of 1 during the decoding process, which is far from being accurate.

Figure 8:
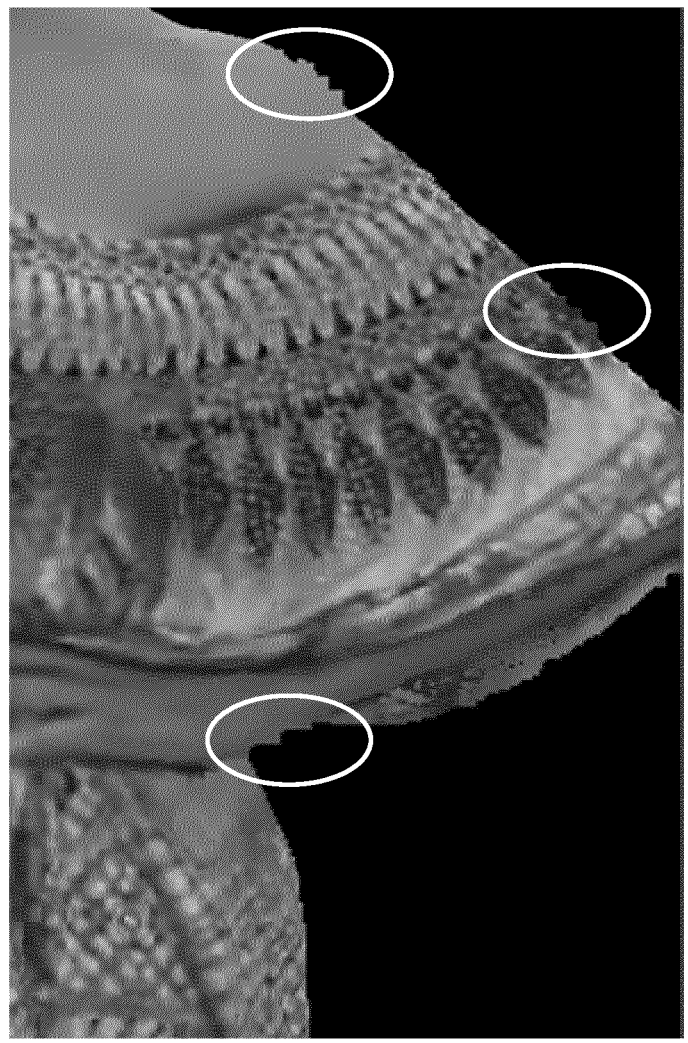
FIG. 8 illustrates an example of a frame from a point cloud reconstructed using a downscaled occupancy map upscaled according to a V-PCC method.

The upscaling of the occupancy map is not normative. An example method is described in the section B2.2 Occupancy nominal format in w19579. This upscaling method results in lots of aliasing artifacts in the reconstructed occupancy map image as illustrated in FIG. 8. FIG. 8 illustrates an example of a frame from a point cloud reconstructed using a downscaled occupancy map upscaled according to a V-PCC method. Circled areas on FIG. 8 highlight aliasing issues in the reconstructed frame. This leads to a 3D reconstruction that is not faithful to the source point cloud and requires the introduction of extra-processing such as geometry smoothing process to decrease aliasing effects.

Figure 9:
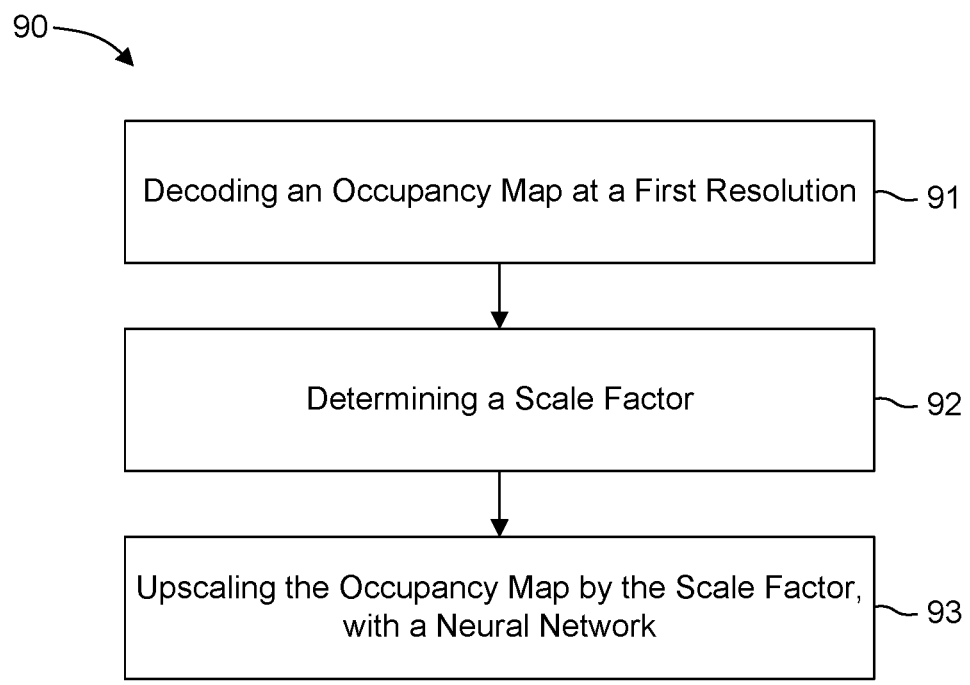
FIG. 9 illustrates a flowchart of a method for reconstructing an occupancy map according to an embodiment.

According to an embodiment, a method for reconstructing a downscaled occupancy map is disclosed. FIG. 9 illustrates a flowchart of a method 90 for reconstructing an occupancy map according to an embodiment. The occupancy map comprises occupancy data of a volumetric content. The volumetric content can be represented as an animated point cloud, or as any other representation suitable for transmitting 3D content, such as an MIV representation (Metadata for Immersive Video), etc. . . . .

At 91, an occupancy map is received and decoded at a first resolution. The occupancy map comprises at least one value indicating whether at least one 2D sample in a 2D projected frame, such as a texture frame or a geometry frame, corresponds to at least one associated sample in the volumetric content.

At 92, a scale factor is determined for the occupancy map, as a function of the first resolution. For instance, the scale factor is determined as a ratio between the width of a frame of the content, such as the width of the geometry frame, and the width of the decoded occupancy map. At 93, the decoded occupancy map is upscaled by the determined scale factor using a neural network.

The method provides an upscaling of the occupancy map in such a way that the occupancy map keeps the benefit of compression efficiency as described above with FIG. 7, that is to say downscaled by a scale factor. The occupancy map is kept compressed as it is done in the V-PCC standard.

According to an embodiment, additional data is sent into the bitstream in order to indicate a preferred upscaling method or occupancy map filtering/synthesis method to apply on the decoder side.

The neural network-based upscaling method aims at improving the upscaling of the 2D image of the occupancy map compared to the straightforward method described in V-PCC. The reconstructed occupancy map image is visually improved by the neural network-based upscaling method.

Figure 10:
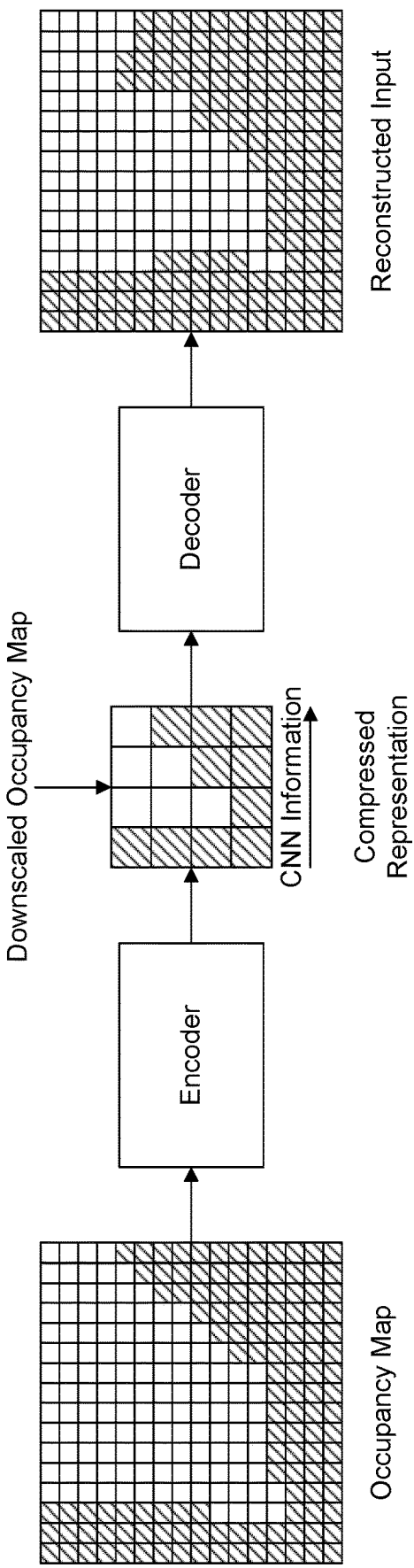
FIG. 10 illustrates a diagram of an exemplary system for transmitting and reconstructing an occupancy map according to an embodiment.

FIG. 10 illustrates a diagram of an exemplary system for transmitting and reconstructing an occupancy map according to an embodiment. An occupancy map is provided to an encoder that downscales the occupancy map and encodes the downscaled occupancy map. The coded occupancy map is then transmitted to a decoder, eventually with neural network information (CNN information). The decoder then decodes the occupancy map and upscales it using the neural network, and eventually the neural network information.

Figure 11:
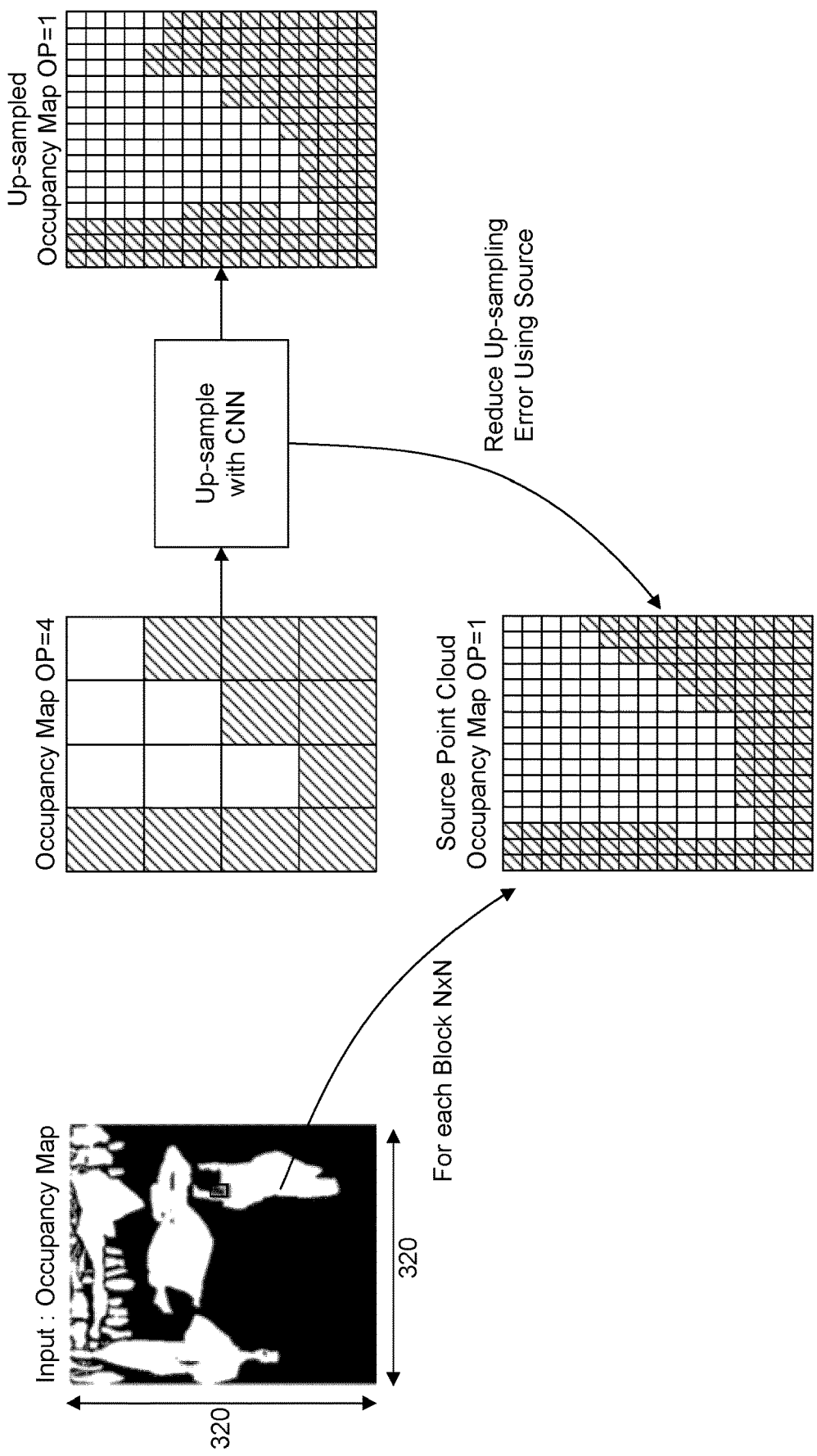
FIG. 11 illustrates an exemplary training of a neural network for upscaling an occupancy map, according to an embodiment.

On the encoder side, the neural network is trained by using source occupancy maps and reconstructed occupancy maps as shown in FIG. 11 illustrating an exemplary training of a neural network for upscaling an occupancy map, according to an embodiment. The training aims at improving the neural network model by minimizing a distance between the reconstructed up-scaled occupancy map and the source occupancy map at its nominal size. On FIG. 11, an example of an input occupancy map is illustrated on the left side of the figure. An example of a source block of the occupancy map is shown with Occupancy precision OP equals to 1, meaning no downscaling is performed, and a corresponding downscaled block by a factor of 4 is shown above (occupancy map OP=4). The right side of the FIG. 11 illustrates the downscaled block which has been upscaled by the neural network. The training aims at minimizing the up-sampling error between the block sample upscaled by the neural network and the source block.

According to an embodiment, the reconstruction of the compressed occupancy map is more faithful to the original point cloud occupancy map than with existing methods implemented in V-PCC test model. The training is a one-time process performed "off-line" which resulting model may be embedded into the decoder or signaled.

Using an upscaling method among several upscaling methods such as neural network, pixel replication, Lancsoz, requires signaling into the bitstream which method is preferred to be used for decoding, eventually with its parameters.

On the decoder side, the bitstream information is demultiplexed and information is used to know which up-scaling method is advised. The reconstruction of the occupancy map may be performed using the corresponding method, with eventually associated parameters.

Figure 12:
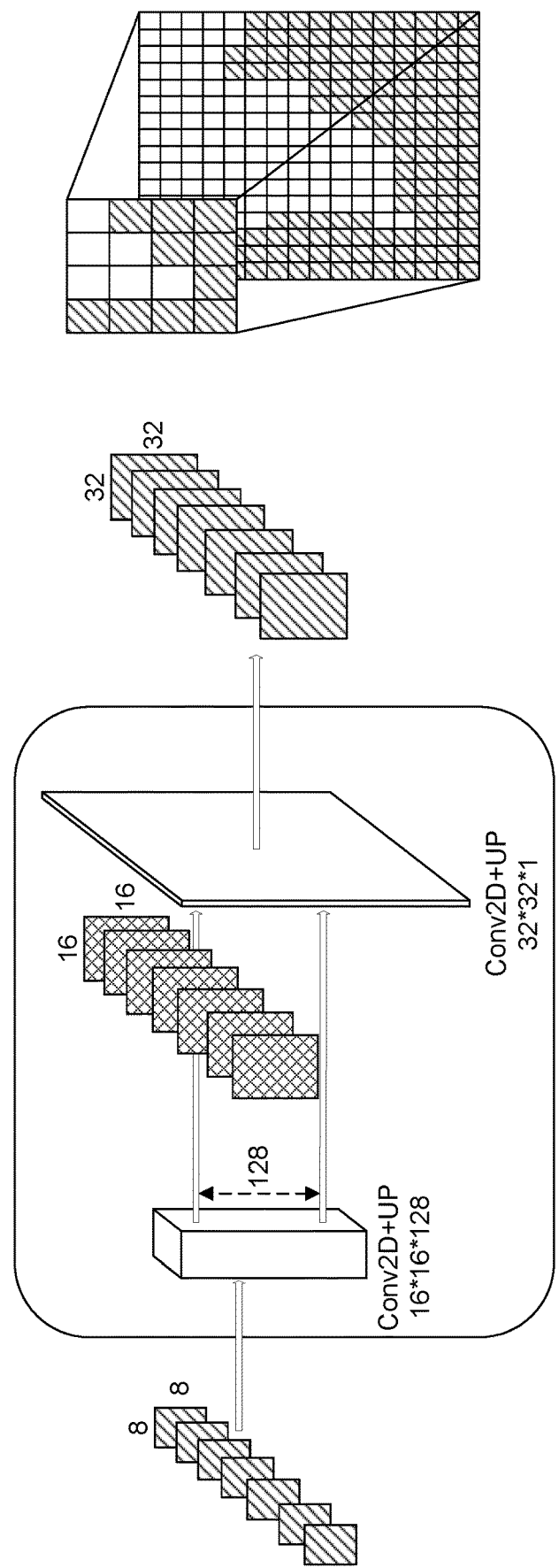
FIG. 12 illustrates an exemplary convolutional neural network for upscaling an occupancy map according to an embodiment.

FIG. 12 illustrates an exemplary convolutional neural network (CNN) for upscaling an occupancy map according to an embodiment. FIG. 12 is an exemplary but non limitative description of a neural networks architecture and set up (training) for up-scaling. According to other variants, upscaling could be done with other Convolutional Neural Networks (CNN) architectures.

The network consists of multiple layers of simple processing units called neuron, which interacts with each other's via weighted connections. Neurons get activated through weighted connections from previously activated neurons. Activation may be subject to thresholding by an activation function.

As shown in FIG. 12, the CNN is trained on small blocks of 8×8 pixels (also called 8×8 blocks) that are aimed at being up-scaled to 32×32 blocks in this example.

Exemplarily, a neural network architecture composed of two layers is used: one input layer and one output layer. The first layer contains 128 neurons while the output layer has one neuron. Each layer is composed of a convolution layer followed by an up-scaling layer, as shown in FIG. 12. An upscaling from 8×8 blocks to 16×16 block is performed. Then, 16×16 blocks are upscaled to 32×32 blocks in the second part of the CNN. This architecture (number of hidden layers and number of neurons per layer) contributes to the balance between learning and prediction quality.

Better performance can be achieved using progressive upscaling, meaning that the upscaling is broken down into a lot of small cascaded upscaling layers with a small factor. Right side of FIG. 12 illustrate an example of a part of an occupancy map upscaled using the CNN by a factor of 4.

An example implementation of the up-scaling CNN model is the following: the CNN up-scaling model is trained with MPEG PCC content (ISO/IEC JTC1/SC29 WG11, Alpbach, Austria, April 2020, w19234, Common Test Conditions for PCC) in the following conditions:
- all model contents: Longdress, Redandblack, Loot, Queen, Soldier, Basketball, Dancer,
- Use of 100 gop_files (one gop contains 32 frames)—3200 frames
- Take all 32 by 32 blocks for each frame
- Execute a random on files, except conditions R05 (which corresponds to the highest bitrate and with the most faithful reconstruction, due to a more precise occupancy map (occupancy map precision is 2) and a lower compression rate on the images)) and RA (Random Access condition).

According to an embodiment, all empty or full 8×8 blocks are excluded from the training as too many full or empty blocks reduce training performance as such blocks are too «easy» to up-scale.

Figure 13:
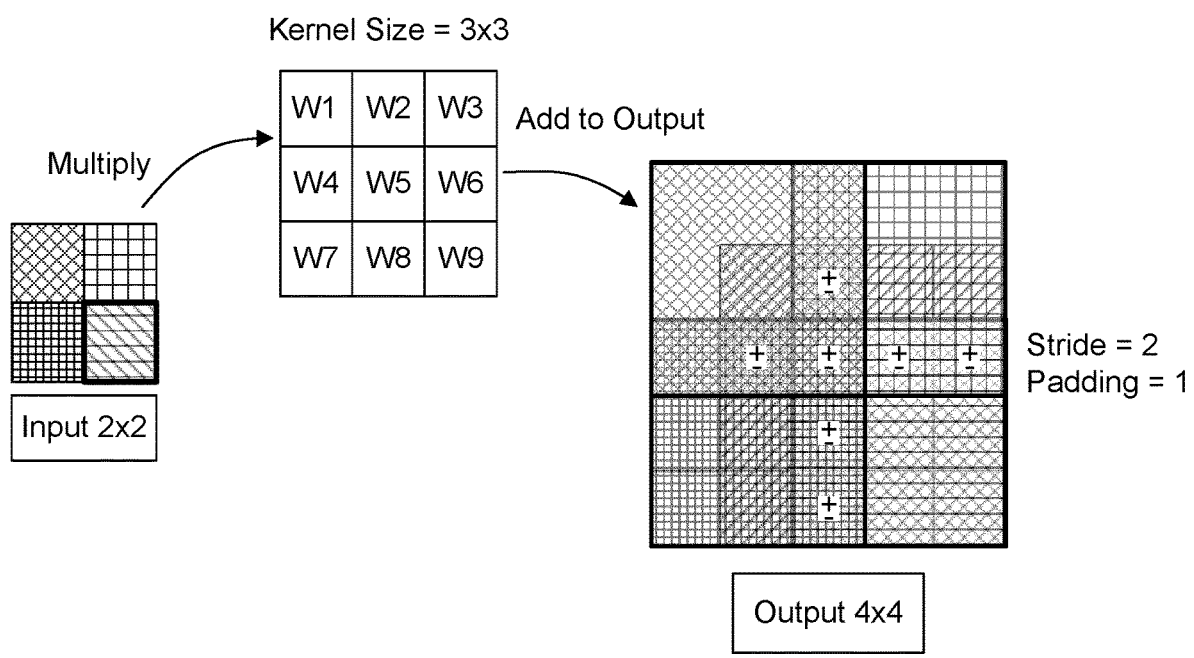
FIG. 13 illustrates an exemplary convolutional neural network for upscaling an occupancy map according to another embodiment.

FIG. 13 illustrates an exemplary convolutional neural network for upscaling an occupancy map according to another embodiment. The convolution and upscale layer are a transposed convolution layer as shown in FIG. 13. For instance, from the input (block size of 2×2), the kernel size (3×3) with a stride of 2 and a padding of 1 produces 4×4 output. Stacking two layers in this manner upscales the image by a factor of 4.

In V-PCC, the up-scaling of the occupancy map, when the occupancy map has been down-sampled at the encoder, shall be performed during the V-PCC decoding process. However, the method for up-scaling is not normative.

In order to provide a verified up-scaling method validated by the content creator or the service provider, the occupancy map up-scaling method could be carried in a (V-PCC) bitstream.

According to an embodiment, a type of the method to perform the occupancy map upscaling is transmitted per atlas or occupancy map instance in the bitstream. The selected method could be a pixel replication method, a neural network-based upscaling method, or another upscaling methods using linear (Lanczos, . . . ), separable or bi-linear up-sampling filters . . . .

The information associated to the occupancy map is carried inside a v3c_parameter_set( ) syntax structure and specifically in the occupancy_information( ) function as shown in the Table 1 below, comprising additional syntax element with respect to the current V-PCC syntax (additional syntax elements are highlighted).

TABLE 1

Occupancy Information

| | Descriptor |
|---|---|
| occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi occupancy type[ atlasId ] | u(3) |
|   if (oi occupancy type[ atlasId ] == 1) { | |
|     oi occupancy cnn params present flag [ atlasId ] | u(1) |
|   if (oi occupancy cnn params present flag [ atlasId ] == 1) | |
|     oi cnn model id | u(3) |
|     oi cnn block size | u(3) |
|   } | |
|   } | |
| } | | oi_occupancy_type indicates the upscaling method of the occupancy map. oi_occupancy_type equal to 0 specifies the upscaling method using a straightforward method as described for example in B2.2 Occupancy nominal format in w19579. oi_occupancy_type equal to 1 specifies an upscaling method using deep neural network. oi_occupancy_type values in range 3 to 7 are reserved for future use by ISO/IEC.

oi_occupancy_cnn_params_present_flag equal to 1 indicates that the information to upscale the occupancy map using deep network is present (oi_occupancy_type equal to 1). oi_occupancy_cnn_params_present_flag equal to 0 indicates that the information to upscale the occupancy map using deep network is not present and default parameter shall be used.

oi_cnn_model_id contains an identifying number that may be used to identify a CNN model path. oi_cnn_model_id shall be in the range of 0 to 7, inclusive. The correspondance between the model path and the oi_cnn_model_id is supposed to be defined into the decoder.

oi_cnn_block_size specifies the value of the block size used by the CNN model as input data size to perform the occupancy map upscaling. oi_cnn_block_size shall be in the range of 0 to 7, inclusive.

In another variant, the additional syntax elements are carried in an essential or non-essential SEI message as per V-PCC definition for instance in the occupancy synthesis SEI message. The same highlighted syntax as in Table 1 is encapsulated in an SEI message.

Figure 14:
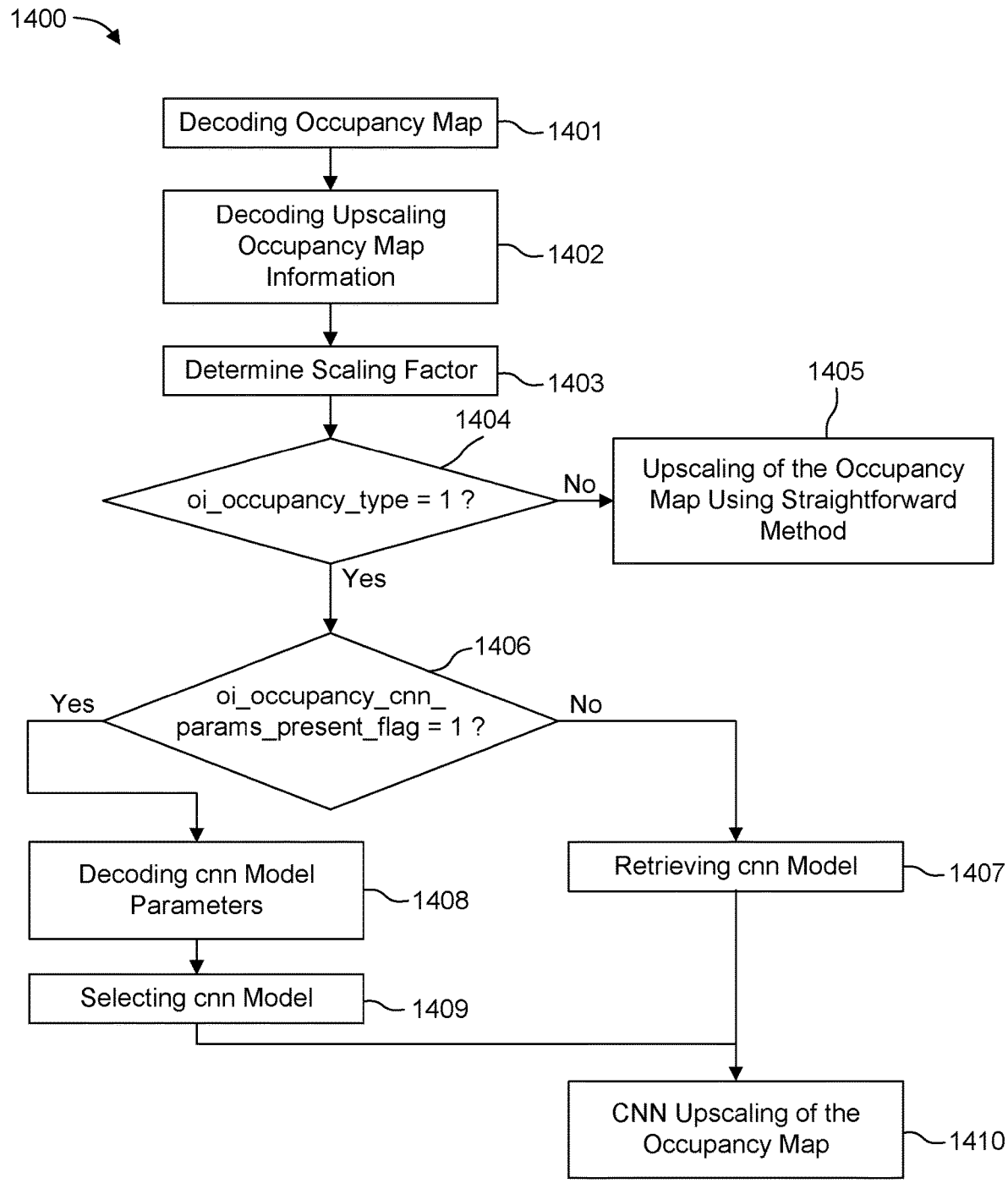
FIG. 14 illustrates a flowchart of a method for reconstructing an occupancy map according to another embodiment.

FIG. 14 illustrates a flowchart of a method 1400 for reconstructing an occupancy map according to another embodiment. At 1401, the bitstream is demultiplexed and the occupancy map is decoded.

At 1402, the information concerning the upscaling occupancy map is extracted and decoded from the bitstream, for instance from the occupancy_information( ) syntax structure as described above.

At 1403, a scale factor for the decoded occupancy map is determined. For instance, the scale factor is determined as the ratio between the geometry frame width and the occupancy map width:

$$scaleFactor = \frac{GeometryFrameWidth}{OccupancyMapWidth}$$

If the scale factor is above 1, then the occupancy map shall be upscaled.

At 1404, it is determined the type of upscaling of the occupancy map. For instance, if the syntax element oi_occupancy_type does not equal 1, the process goes to 1405 and the occupancy map is upscaled using a straightforward method, for instance using the pixel replication method.

If the syntax element oi_occupancy_type equals 1, the process goes to 1406. According to this embodiment, the upscaling is performed using a neural network. At 1406, it is determined whether CNN parameters are present in the bitstream, for instance by checking the syntax element oi_occupancy_cnn_params_present_flag. If CNN parameters are not present in the bitstream, at 1407, the CNN parameters are retrieved from the memory of the decoder. For instance, one or more default CNN models are stored in memory, each default CNN models being associated with a CNN input block size, and a scale factor.

According to a variant wherein CNNs are associated to different scale factor, at 1407, a CNN is selected according to the scale factor determined at 1403.

According to another variant wherein no CNN associated to the determined scale factor is available, a default CNN is selected and iteration of the CNN is applied when upscaling the occupancy map at 1410. For instance, if a default CNN associated to a scale factor of 2 is retrieved, and the scale factor determined at 1403 is 4, the decoded occupancy map is upscaled at 1410 by applied twice the default CNN.

If CNN parameters are present in the bitstream (yes at 1406), then at 1408, the CNN parameters are decoded from the bitstream. Different variants described below are possible.

At 1409, a CNN model is selected based on the decoded CNN parameters, and the decoded occupancy map is upscaled at 1410 using the selected CNN model.

The CNN model is selected at 1409 among a group of neural networks models, depending on the CNN parameters signaled in the bitstream.

According to a variant, the CNN model is selected based on a CNN model identifier signaled in the bitstream. According to this variant, different CNN models associated with an identifier are stored at the decoder, each CNN model having different structure and/or weights.

According to another embodiment, the CNN model is selected based on an input block size of the CNN.

The CNN parameters can be signaled in the bitstream at the patch level, or at the image level, or at the sequence level. The CNN parameters can be signaled in a supplemental enhancement information message or in an occupancy synthesis supplemental enhancement information message.

According to an embodiment, it is assumed that the models and weights are known to the decoder and therefore these models are not carried in the bitstream.

According to another embodiment, models and weights of the CNN are carried in the bitstream or another bitstream as side information. In this embodiment, the weights are compressed, for instance with a trade-off between the weight dynamics and the required accuracy, or to reduce the size of the networks.

According to embodiments of method 1400, an upscaled occupancy map at its nominal resolution is output and can be used for reconstructing a 3D object, such as a point cloud frame.

Figure 15:
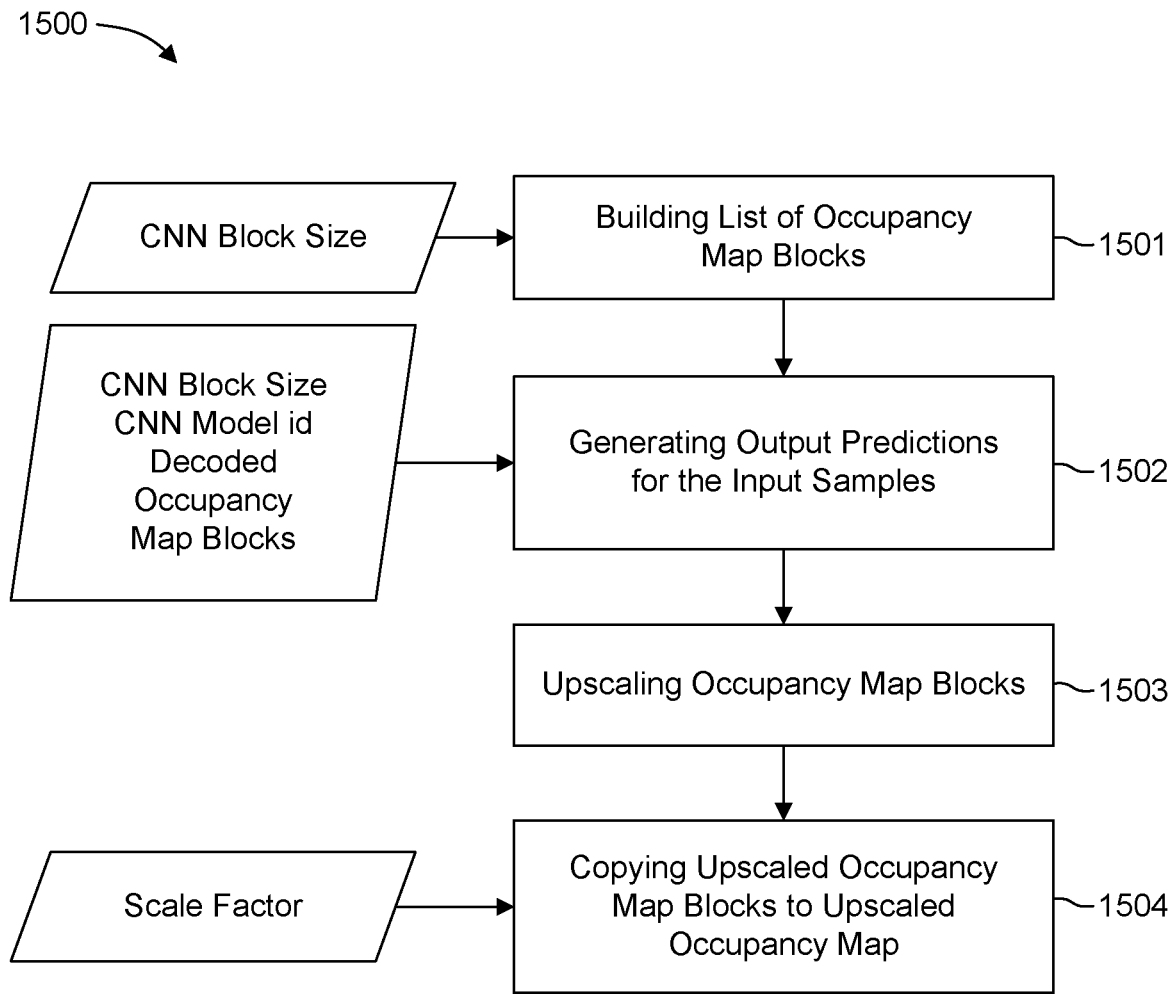
FIG. 15 illustrates a flowchart of a method for CNN upscaling of an occupancy map according to an embodiment.

FIG. 15 illustrates a flowchart of a method 1500 for CNN upscaling of an occupancy map according to an embodiment. FIG. 15 shows details on the CNN upscaling process block. At 1501, a list of occupancy map blocks is built from the decoded occupancy map, based on the CNN block size input. At 1502, output prediction is generated for each input sample having a size of the CNN block size, an input sample being a block of the decoded occupancy map.

At 1503, the blocks of the occupancy map are input to the CNN and upscaled by the CNN. The CNN outputs the upscaled occupancy map blocks in the generated output predictions. At 1504, each upscaled occupancy map block is copied in an occupancy map image, as a function of the scale factor.

In the following, embodiments are described wherein different signaling of the CNN parameters are presented.

According to an embodiment, in case the CNN is fully convolutional, the oi_cnn_block_size is not needed on the decoder side. Fully convolutional network is a cascade of convolutions. An advantage of this type of neural network is the flexibility of use because a model may be learnt on defined block sizes (e.g. 8×8 or 16×16, or whatever) and applied to any block size at the decoder. The input size is given by the decoder and the CNN upscales the image by applying the information of the upscaling factor, scaleFactor, which is written in the architecture of the CNN model. This information of scaleFactor is computed from the padding, stride and size of the convolutional kernel in each convolutional layer.

The upscaling of the occupancy map is performed by a deep CNN identified by oi_cnn_model_id syntax element. A example of corresponding syntax is described in Table 2 below:

TABLE 2

| Occupancy Information for fully convolutional network | |
|---|---|
| | Descriptor |
| occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi occupancy type[ atlasId ] | u(3) |
|   if (oi occupancy type[ atlasId ] == 1) { | |
|     oi occupancy cnn params present flag [ atlasId ] | u(1) |
|   if (oi occupancy cnn params present flag [ atlasId ] == 1) { | |
|     oi cnn model id | u(3) |
|   } | |
| } | |
| } | | oi_occupancy_type indicates the upscaling method of the occupancy map. oi_occupancy_type equal to 0 specifies the upscaling method using a straightforward method as described for example in B2.2 Occupancy nominal format in w19579. oi_occupancy_type equal to 1 specifies a upscaling method using deep neural network. oi_occupancy_type values in range 3 to 7 are reserved for future use by ISO/IEC.

oi_occupancy_cnn_params_present_flag equal to 1 indicates that the information to upscale the occupancy map using deep network is present (oi_occupancy_type equal to 1). oi_occupancy_cnn_params_present_flag equal to 0 indicates that the information to upscale the occupancy map using deep network is not present and default parameter shall be used.

oi_cnn_model_id contains an identifying number that may be used to identify a CNN model path. oi_cnn_model_id shall be in the range of 0 to 7, inclusive. The correspondance between the model path and the oi_cnn_model_id is supposed to be defined into the decoder.

According to another embodiment, when there is only one model that upscales the occupancy map, then the oi_cnn_model_id does not need to be signaled. The decoder uses the one known as the default cnn_model_id. An example of a corresponding syntax is presented in Table 3 below:

TABLE 3

Occupancy Information when the cnn model is unique and available on decoder side

| | Descriptor |
|---|---|
| occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi occupancy type[ atlasId ] | u(3) |
|   if (oi occupancy type[ atlasId ] == 1) { | |
|     oi occupancy cnn params present flag [ atlasId ] | u(1) |
|     if (oi occupancy cnn params present flag [ atlasId ] == 1) { | |
|       oi cnn block size | u(3) |
|     } | |
|   } | |
| } | | oi_occupancy_type indicates the upscaling method of the occupancy map. oi_occupancy_type equal to 0 specifies the upscaling method using a straightforward method as described for example in B2.2 Occupancy nominal format in w19579. oi_occupancy_type equal to 1 specifies a upscaling method using deep neural network. oi_occupancy_type values in range 3 to 7 are reserved for future use by ISO/IEC. oi_occupancy_cnn_params_present_flag equal to 1 indicates that the information to upscale the occupancy map using deep network is present (oi_occupancy_type equal to 1). oi_occupancy_cnn_params_present_flag equal to 0 indicates that the information to upscale the occupancy map using deep network is not present and default parameter shall be used.

oi_cnn_block_size specifies the value of the block size used by the CNN model as input data size to perform the occupancy map upscaling. oi_cnn_block_size shall be in the range of 0 to 7, inclusive.

Previous embodiments can be combined. According to another embodiment, the CNN is fully convolutional (so oi_cnn_block_size is not needed) and oi_cnn_model_id is unique on decoder side. An example of a corresponding syntax is presented in Table 4 below:

TABLE 4

Occupancy Information when decoder knows the cnn_model to use and this cnn model is fully convolutional

| | Descriptor |
|---|---|
| occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi occupancy type[ atlasId ] | u(3) |
| } | | oi_occupancy_type indicates the upscaling method of the occupancy map. oi_occupancy_type equal to 0 specifies the upscaling method using a straightforward method as described for example in B2.2 Occupancy nominal format in w19579. oi_occupancy_type equal to 1 specifies a upscaling method using deep neural network. oi_occupancy_type values in range 3 to 7 are reserved for future use by ISO/IEC.

As a variant, several methods (type) can be signalled at the same time for instance thanks to a for . . . loop on top of "occupancy type" signaled methods.

According to another embodiment, no upscaling CNN model may allow upscaling at the determined scale factor and the upscaling CNN model may have to be applied several times. For example, if the upscaling neural network available at the decoder, or identified at the decoder, only allows upscaling by a factor of 2, while the determined scaleFactor is 4, the neural network can be called up twice in succession. According to this embodiment, a flag to indicate if the neural network has to be applied several times and how many times is signaled. An example of syntax is described in Table 5 below:

TABLE 5

Occupancy Information when iteration on model is needed

| | Descriptor |
|---|---|
| occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi occupancy type[ atlasId ] | u(3) |
|   if (oi occupancy type[ atlasId ] == 1) { | |
|     oi occupancy cnn params present flag [ atlasId ] | u(1) |
|     if (oi occupancy cnn params present flag [ atlasId ] == 1) { | |
|       oi cnn model id | u(3) |
|       oi cnn block size | u(3) |
|       oi cnn iteration | u(3) |
|     } | |
|   } | |
| } | | oi_occupancy_type indicates the upscaling method of the occupancy map. oi_occupancy_type equal to 0 specifies the upscaling method using a straightforward method as described for example in B2.2 Occupancy nominal format in w19579. oi_occupancy_type equal to 1 specifies a upscaling method using deep neural network. oi_occupancy_type values in range 3 to 7 are reserved for future use by ISO/IEC.

oi_occupancy_cnn_params_present_flag equal to 1 indicates that the information to upscale the occupancy map using deep network is present (oi_occupancy_type equal to 1). oi_occupancy_cnn_params_present_flag equal to 0 indicates that the information to upscale the occupancy map using deep network is not present and default parameter shall be used.

oi_cnn_model_id contains an identifying number that may be used to identify a CNN model path. oi_cnn_model_id shall be in the range of 0 to 7, inclusive. The correspondance between the model path and the oi_cnn_model_id is supposed to be defined into the decoder.

oi_cnn_block_size specifies the value of the block size used by the CNN model as input data size to perform the occupancy map upscaling. oi_cnn_block_size shall be in the range of 0 to 7, inclusive.

oi_cnn_iteration specifies the number of successive calls of the CNN model needed to upscale the occupancy map by the determined scaleFactor. oi_cnn_iteration shall be in the range of 0 to 7, inclusive.

As above, this embodiment can be combined with the previous embodiments. Table 6 below illustrates an example of syntax when the network is fully convolutional (no signaling of oi_cnn_block_size):

TABLE 6

Occupancy Information when iteration on model is needed and fully convolutional model

| | Descriptor |
|---|---|
| occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi occupancy type[ atlasId ] | u(3) |
|   if (oi occupancy type[ atlasId ] == 1) { | |
|     oi occupancy cnn params present flag [ atlasId ] | u(1) |
|   if (oi occupancy cnn params present flag [ atlasId ] == 1) { | |
|     oi cnn model id | u(3) |
|     oi cnn iteration | u(3) |
|     } | |
|   } | |
| } | |

Table 7 below illustrates another example of syntax wherein oi_cnn_model_id is not signaled and decoder uses a default cnn model:

TABLE 7

Occupancy Information when iteration on model is needed and no identifier of model is sent to the decoder

| | Descriptor |
|---|---|
| - occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi occupancy type[ atlasId ] | u(3) |
|   if (oi occupancy type[ atlasId ] == 1) { | |
|     oi occupancy cnn params present flag [ atlasId ] | u(1) |
|     if (oi occupancy cnn params present flag [ atlasId ] == 1) { | |
|       oi cnn block size | u(3) |
|       oi cnn iteration | u(3) |
|     } | |
|   } | |
| } | |

Table 8 below illustrates another example of syntax wherein the fully convolutional neural network is combined with the use of a default model:

TABLE 8

Occupancy Information when iteration on model is needed, the model is fully convolutional.

| | Descriptor |
|---|---|
| occupancy_information( atlasId ) { | |
|   oi_occupancy_codec_id[ atlasId ] | u(8) |
|   oi_lossy_occupancy_map_compression_threshold[ atlasId ] | u(8) |
|   oi_occupancy_nominal_2d_bitdepth_minus1[ atlasId ] | u(5) |
|   oi_occupancy_MSB_align_flag[ atlasId ] | u(1) |
|   oi occupancy type[ atlasId ] | u(3) |
|   if (oi occupancy type[ atlasId ] == 1) { | |
|     oi occupancy cnn params present flag [ atlasId ] | u(1) |
|     if (oi occupancy cnn params present flag [ atlasId ] == 1) { | |
|       oi cnn iteration | u(3) |
|     } | |
|   } | |
| } | |

Table 9 below illustrates another example of syntax. Previously, upscaling information on occupancy map is carried per each atlasId. According to another embodiment, the method indicating how to upscale the occupancy map is also carried once per bitstream or sub-bitstream, for instance at v3c_unit_header( ) level as shown in Table 9.

TABLE 9

Occupancy Information when signaled in the v3c_unit_header

| | Descriptor |
|---|---|
| v3c_unit_header( ) { | |
|   vuh_unit_type | u(5) |

TABLE 9-continued

Occupancy Information when signaled in the v3c_unit_header

| | Descriptor |
|---|---|
| if( vuh_unit_type = = V3C_AVD \|\| vuh_unit_type = = V3C_GVD \|\| vuh_unit_type = = V3C_OVD \|\| vuh_unit_type = = V3C_AD ) { | |
|   vuh_v3c_parameter_set_id | u(4) |
|   vuh_atlas_id | u(6) |
| } | |
| if( vuh_unit_type = = V3C_AVD ) { | |
|   vuh_attribute_index | u(7) |
|   vuh_attribute_partition_index | u(5) |
|   vuh_map_index | u(4) |
|   vuh_auxiliary_video_flag | u(1) |
| } else if( vuh_unit_type = = V3C_GVD ) { | |
|   vuh_map_index | u(4) |
|   vuh_auxiliary_video_flag | u(1) |
|   vuh_reserved_zero_12bits | u(12) |
| } if( vuh_unit_type = = V3C_OVD ) | |
|   vuh_occupancy_type | u(3) |
|   if (vuh_occupancy_type == 1) { | |
|     vuh_occupancy_cnn_params_present_flag | u(1) |
|     if (vuh_occupancy_cnn_params_present_flag == 1) { | |
|       vuh_cnn_model_id | u(3) |
|       vuh_cnn_block_size | u(3) |
|     } | |
|   } | |
|   vuh_reserved_zero_6bits | u(6) |
| } else if( vuh_unit_type = = V3C_AD ) | |
|   vuh_reserved_zero_17bits | u(17) |
| else | |
|   vuh_reserved_zero_27bits | u(27) |
| } | | vuh_occupancy_type indicates the upscaling method of the occupancy map. vuh_occupancy_type equal to 0 specifies the upscaling method using a straightforward method as described for example in B2.2 Occupancy nominal format in w19579. vuh_occupancy_type equal to 1 specifies a upscaling method using deep neural network. vuh_occupancy_type values in range 3 to 7 are reserved for future use by ISO/IEC.

vuh_occupancy_cnn_params_present_flag equal to 1 indicates that the information to upscale the occupancy map using deep network is present (vuh_occupancy_type equal to 1). vuh_occupancy_cnn_params_present_flag equal to 0 indicates that the information to upscale the occupancy map using deep network is not present and default parameter shall be used.

vuh_cnn_model_id contains an identifying number that may be used to identify a CNN model path. vuh_cnn_model_id shall be in the range of 0 to 7, inclusive.

vuh_cnn_block_size specifies the value of the block size used by the CNN model as input data size to perform the occupancy map upscaling. vuh_cnn_block_size shall be in the range of 0 to 7, inclusive.

According to another embodiment, the method of upscaling the occupancy map is signaled using the SEI mechanisms. For the occupancy map upscaling, a new payload_type is defined with persistence "The access unit containing the SEI message".

An example of such an SEI syntax is presented in Table 10 below:

TABLE 10

Occupancy upscaling parameters SEI message

| Syntax | Descriptor |
|---|---|
| occupancy_upscaling_params ( payloadSize ) { | |
|   oup_occupancy_type | u(3) |
|   if (oup_occupancy_type == 1) { | |

TABLE 10-continued

Occupancy upscaling parameters SEI message

| Syntax | Descriptor |
|---|---|
|     oup_occupancy_cnn_params_present_flag | u(1) |
|     if (oup_occupancy_cnn_params_present_flag == 1) { | |
|       oup_cnn_model_id | u(3) |
|       oup_cnn_block_size | u(3) |
| } | |

This embodiment can be combined with any one of the embodiments presented above, namely the fully convolutional, the default model_id, a number of CNN iteration.

According to another embodiment, the occupancy synthesis SEI message can be used to signal the method to be used for upscaling the occupancy map, as shown in Table 11 below.

The occupancy synthesis SEI message specifies the recommended occupancy synthesis methods and their associated parameters that could be used to process the occupancy video frames associated with a current point cloud frame when the occupancy video frames are of a lower resolution than the nominal resolution of the atlas.

Occupancy Synthesis SEI Message Syntax

TABLE 11

Occupancy upscaling parameters in Occupancy synthesis SEI message

| | Descriptor |
|---|---|
| occupancy_synthesis( payloadSize ) { | |
|   os_persistence_flag | u(1) |
|   os_reset_flag | u(1) |
|   os_instances_updated | u(8) |

TABLE 11-continued

Occupancy upscaling parameters in Occupancy synthesis SEI message

| | Descriptor |
|---|---|
| for( i = 0; i < os_instances_updated; i++ ) { | |
|   os_instance_index[ i ] | u(8) |
|   k = os_instance_index[ i ] | |
|   os_instance_cancel_flag[ k ] | u(1) |
|   if( os_instance_cancel_flag[ k ] != 1){ | |
|     os_method_type[ k ] | u(8) |
|     if( os_method_type[ k ] == 1){ | |
|       os_pbf_log2_threshold_minus1[ k ] | u(2) |
|         os_pbf_passes_count_minus1[ k ] | u(2) |
|         os_pbf_filter_size_minus1[ k ] | u(3) |
|     } | |
|     if( os_method_type[ k ] == 2){ | |
|       os occupancy type | u(3) |
| if (os occupancy type == 1) { | |
| os occupancy cnn params present flag | u(1) |
|   if | |
| (os occupancy cnn params present flag == 1) { | |
|     os cnn model id | u(3) |
| os cnn block size | u(3) |
|     } | |
|   } | |
|     } | |
|   } | |
| } | |

Figure 16:
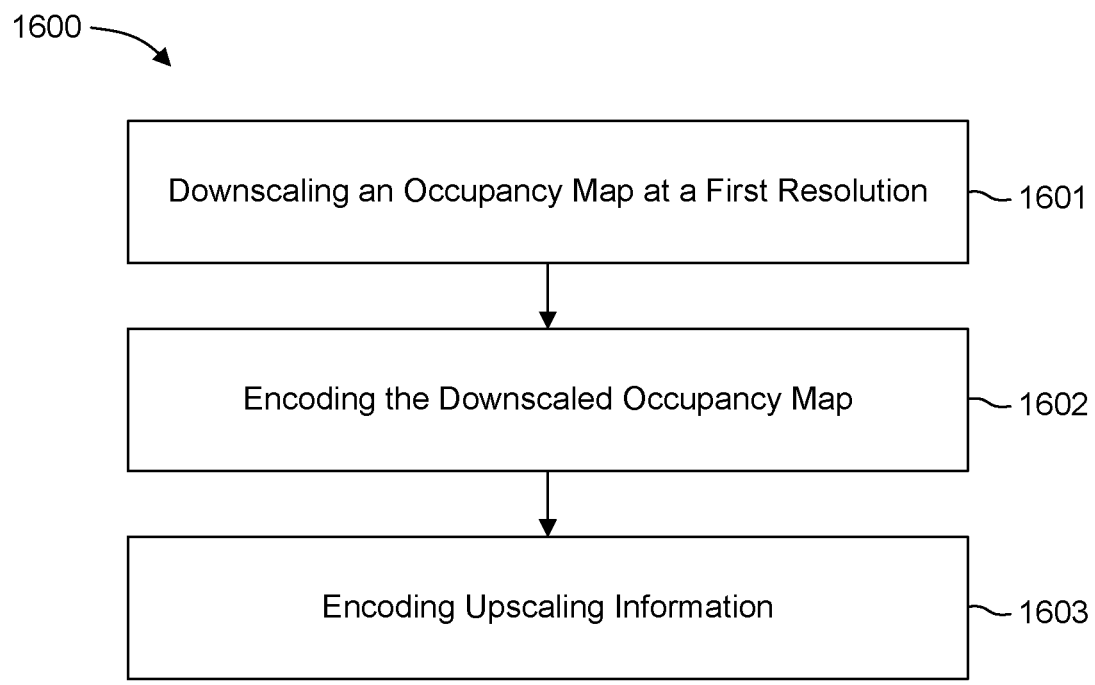
FIG. 16 illustrates a flowchart of a method for encoding an occupancy map according to an embodiment.

FIG. 16 illustrates a flowchart of a method for encoding an occupancy map according to an embodiment. At 1601, the occupancy map is downscaled to a first resolution. At 1602, the downscaled occupancy map is encoded, for instance as described in reference with FIGS. 1 and 3. At 1603, upscaling occupancy information is encoded. Upscaling occupancy information comprises any one of the embodiments described above. For instance, at 1603, an information indicating whether the occupancy map is to be upscaled using a neural network or another upscaling method for reconstructing the occupancy map, is encoded. The upscaling occupancy information can be embedded in a bitstream as the bitstream illustrated in FIG. 5.

In FIG. 1-16, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 6010 or by hardware, or by a combination of hardware and software. As a non-limiting example, the embodiments may be also implemented by one or more integrated circuits. The memory 6020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 6010 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by an image-based decoder. In various embodiments, such processes also, or alternatively, include processes performed by a decoder of various implementations described in this application, for example, As further examples, in one embodiment "decoding" may refer only to entropy decoding, in another embodiment "decoding" may refer only to differential decoding, and in another embodiment "decoding" may refer to a combination of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an image-based decoder. In various embodiments, such processes also, or alternatively, include processes performed by an encoder of various implementations described in this application, for example.

As further examples, in one embodiment "encoding" may refer only to entropy encoding, in another embodiment "encoding" may refer only to differential encoding, and in another embodiment "encoding" may refer to a combination of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Various embodiments refer to rate distortion optimization. In particular, during the encoding process, the balance or trade-off between the rate and distortion is usually considered, often given the constraints of computational complexity. The rate distortion optimization may be usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches may also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular XXX. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, comprising:
signaling, in a bitstream, data representative of a volumetric content, the volumetric content being represented as a set of projections onto one or more atlases, the one or more atlases being video-based encoded, the one or more atlases comprising at least one attribute frame, one geometry frame and one occupancy map, and
signaling, in the bitstream, an information indicating a method among at least two methods for upscaling at least one of the one or more atlases when reconstructing the volumetric content,
wherein the at least one of the one or more atlases is an occupancy map, and
wherein one of the at least two methods is a neural network-based upscaling.

2. The method of claim 1, wherein the information further comprises at least one of an indicator representative of a neural network model, a size of block used as input of a neural network or a number of iterations according to which upscaling of the occupancy map is iterated.

3. An apparatus, comprising one or more processors, wherein the one or more processors are configured to:
signal, in a bitstream, data representative of a volumetric content, the volumetric content being represented as a set of projections onto one or more atlases, the one or more atlases being video-based encoded, the one or more atlases comprising at least one attribute frame, one geometry frame and one occupancy map, and
signal, in the bitstream, an information indicating a method among at least two methods for upscaling at least one of the one or more atlases when reconstructing the volumetric content,
wherein the at least one of the one or more atlases is an occupancy map, and
wherein one of the at least two methods is a neural network-based upscaling.

4. The apparatus of claim 3, wherein the information further comprises at least one of an indicator representative of a neural network model, a size of block used as input of a neural network or a number of iterations according to which upscaling of the occupancy map is iterated.

5. A method, comprising reconstructing a volumetric content from a bitstream, the volumetric content being represented as a set of projections onto one or more atlases, the one or more atlases being video-based encoded, the one or more atlases comprising at least one attribute frame, one geometry frame and one occupancy map, wherein reconstructing the volumetric content comprises:
decoding an information indicating a method among at least two methods for upscaling at least one of the one or more atlases, wherein one of the at least two methods is a neural network-based upscaling,
wherein the at least one of the one or more atlases is an occupancy map,
decoding the occupancy map from the bitstream, and
upscaling the occupancy map.

6. The method of claim 5, wherein the information indicates use of a neural network for upscaling the occupancy map.

7. The method of claim 6, wherein reconstructing the volumetric content further comprises obtaining the neural network based on at least one of an indicator representative of a neural network model, a size of block used as input of the neural network or a scale factor by which the occupancy map is upscaled.

8. The method of claim 7, wherein the scale factor is determined based on a resolution of the occupancy map and a nominal resolution of the volumetric content.

9. The method of claim 5, wherein the information further comprises an indicator representative of a neural network model.

10. The method of claim 5, wherein the information further comprises a size of block used as input of a neural network.

11. The method of claim 5, wherein a neural network is associated to a second scale factor, and responsive to a determination that the second scale factor does not match a scale factor to which the occupancy map is to be upscaled, upscaling the occupancy map comprises iterating upscaling of the occupancy map using the neural network.

12. The method of claim 11, wherein the information further indicates a number of iterations according to which upscaling of the occupancy map is iterated.

13. The method of claim 5, wherein the information is signaled at a patch level, or at an image level, or at a sequence level, or in a supplemental enhancement information message, or in a unit header of the bitstream.

14. The method of claim 5, wherein the occupancy map comprises at least one value indicating whether at least one sample in a geometry or attribute frame corresponds to at least one associated sample in the volumetric content.

15. A non-transitory computer readable storage medium having stored thereon instructions for causing one or more processors to perform the method of claim 5.

16. An apparatus, comprising one or more processors, wherein the one or more processors are configured to reconstruct a volumetric content from a bitstream, the volumetric content being represented as a set of projections onto one or more atlases, the one or more atlases being video-based encoded, the one or more atlases comprising at least one attribute frame, one geometry frame and one occupancy map, wherein reconstructing the volumetric content comprises:
decoding an information indicating a method among at least two methods for upscaling at least one of the one or more atlases, wherein one of the at least two methods is a neural network-based upscaling,
wherein the at least one of the one or more atlases is an occupancy map,
decoding the occupancy map from the bitstream, and
upscaling the occupancy map.

17. The apparatus of claim 16, comprising at least one of (i) an antenna configured to receive a signal, the signal including data representative of at least one part of a volumetric content, (ii) a band limiter configured to limit the signal to a band of frequencies that includes the data representative of the at least one part of the volumetric content, or (iii) a display configured to display the at least one part of the volumetric content.

18. The apparatus according to claim 17, comprising a TV, a cell phone, a tablet, a Set Top Box or a Head Mounted Display.

19. The apparatus of claim 16, wherein the information indicates use of a neural network for upscaling the occupancy map.

20. The apparatus of claim 16, wherein the information further comprises at least one of an indicator representative of a neural network model, a size of block used as input of a neural network or a number of iterations according to which upscaling of the occupancy map is iterated.

* * * * *